(12) United States Patent
Benedetto

(10) Patent No.: US 11,786,821 B2
(45) Date of Patent: *Oct. 17, 2023

(54) INSTANT STREAMING OF A MOBILE USER INTERFACE TO A DEVICE OF A SECONDARY USER WITHOUT APPLICATION INSTALL

(71) Applicant: Sony Interactive Entertainment LLC, San Mateo, CA (US)

(72) Inventor: Warren Benedetto, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,447

(22) Filed: Feb. 8, 2022

(65) Prior Publication Data

US 2022/0161140 A1 May 26, 2022

Related U.S. Application Data

(63) Continuation of application No. 15/588,003, filed on May 5, 2017, now Pat. No. 11,241,623.

(51) Int. Cl.
| | | |
|---|---|---|
| A63F 13/63 | (2014.01) | |
| A63F 13/5375 | (2014.01) | |
| A63F 13/5378 | (2014.01) | |
| A63F 13/31 | (2014.01) | |
| A63F 13/533 | (2014.01) | |
| A63F 13/25 | (2014.01) | |
| A63F 13/327 | (2014.01) | |
| A63F 13/86 | (2014.01) | |
| A63F 13/847 | (2014.01) | |

(52) U.S. Cl.
CPC .............. *A63F 13/63* (2014.09); *A63F 13/25* (2014.09); *A63F 13/31* (2014.09); *A63F 13/327* (2014.09); *A63F 13/533* (2014.09); *A63F 13/5375* (2014.09); *A63F 13/5378* (2014.09); *A63F 13/86* (2014.09); *A63F 13/847* (2014.09)

(58) Field of Classification Search
None
See application file for complete search history.

(56) References Cited

U.S. PATENT DOCUMENTS

| | | | | |
|---|---|---|---|---|
| 5,618,045 A | * | 4/1997 | Kagan | A63F 13/323 463/40 |
| 7,445,549 B1 | * | 11/2008 | Best | H04N 13/356 463/31 |
| 2004/0090450 A1 | * | 5/2004 | Gill | G06F 11/2294 715/709 |

(Continued)

*Primary Examiner* — Tramar Harper
(74) *Attorney, Agent, or Firm* — PENILLA IP, APC

(57) ABSTRACT

A method for communication. The method including displaying game play of a first user playing a gaming application on a display. The method including broadcasting an SSID from a first device over a wireless local area network. The method including pairing the first device and a second device associated with a second user over the wireless local area network. The method including streaming a user interface including information related to the first game play from the first device to the second device. The user interface is streamed concurrent with the game play of the first user, and is configured to complement game play of the first user.

20 Claims, 11 Drawing Sheets

(56) References Cited

U.S. PATENT DOCUMENTS

| | | | | |
|---|---|---|---|---|
| 2005/0021159 A1* | 1/2005 | Ogawa | A63F 13/215 | 700/91 |
| 2006/0247059 A1* | 11/2006 | Nogami | A63F 13/12 | 463/42 |
| 2007/0060354 A1* | 3/2007 | Theimer | A63F 13/48 | 463/40 |
| 2007/0093294 A1* | 4/2007 | Serafat | A63F 13/31 | 463/42 |
| 2007/0117635 A1* | 5/2007 | Spanton | A63F 13/12 | 463/43 |
| 2008/0009334 A1* | 1/2008 | Walker | G07F 17/32 | 463/16 |
| 2008/0113810 A1* | 5/2008 | Kubota | G07F 17/3223 | 463/42 |
| 2008/0119286 A1* | 5/2008 | Brunstetter | A63F 13/95 | 463/43 |
| 2009/0215473 A1* | 8/2009 | Hsu | H04W 8/183 | 455/458 |
| 2009/0325711 A1* | 12/2009 | Bronstein | G06Q 50/34 | 463/42 |
| 2011/0044308 A1* | 2/2011 | Kawamura | H04W 76/23 | 455/41.2 |
| 2011/0111859 A1* | 5/2011 | Fiedler | H04L 67/131 | 463/43 |
| 2011/0143840 A1* | 6/2011 | Sotoike | H04L 67/131 | 455/500 |
| 2011/0244955 A1* | 10/2011 | Dinka | H04N 21/6125 | 463/31 |
| 2012/0131098 A1* | 5/2012 | Wood | H04N 21/4722 | 709/203 |
| 2013/0203489 A1* | 8/2013 | Lyons | G07F 17/3209 | 463/30 |
| 2016/0023109 A1* | 1/2016 | Colenbrander | A63F 13/95 | 463/43 |
| 2016/0028697 A1* | 1/2016 | Shui | H04L 9/08 | 713/168 |
| 2017/0001111 A1* | 1/2017 | Willette | A63F 13/49 | |
| 2017/0072324 A1* | 3/2017 | Navok | A63F 13/847 | |
| 2017/0165569 A1* | 6/2017 | van Welzen | H04N 7/147 | |
| 2017/0206054 A1* | 7/2017 | Wiggemans | A63F 13/22 | |
| 2018/0146366 A1* | 5/2018 | Hawkins | G06K 7/1447 | |

* cited by examiner

US 11,786,821 B2

INSTANT STREAMING OF A MOBILE USER INTERFACE TO A DEVICE OF A SECONDARY USER WITHOUT APPLICATION INSTALL

CLAIM OF PRIORITY

This application is a continuation of and claims priority to and the benefit of commonly owned, U.S. patent application Ser. No. 15/588,003, filed on May 5, 2017, entitled "Instant Streaming Of A Mobile User Interface Without Application Install," the disclosure of which is incorporated herein in its entirety for all purposes.

CROSS REFERENCE TO RELATED APPLICATIONS

The present application is related to the commonly assigned, U.S. patent application Ser. No. 15/411,421, filed on Jan. 20, 2017, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM," which is herein incorporated by reference in its entirety. The present application is related to the commonly assigned, U.S. patent application Ser. No. 15/476,597, filed on Mar. 31, 2017, entitled "GAME PLAY COMPANION APPLICATION," which is herein incorporated by reference in its entirety. The present application is related to the commonly assigned, U.S. patent application Ser. No. 15/379,360, filed on Dec. 14, 2016, entitled "METHOD AND SYSTEM FOR ACCESSING PREVIOUSLY STORED GAME PLAY VIA VIDEO RECORDING AS EXECUTED ON A GAME CLOUD SYSTEM," which is herein incorporated by reference in its entirety. This application is related to commonly assigned, U.S. patent application Ser. No. 13/779,730, entitled "SYSTEMS AND METHODS FOR TAGGING CONTENT OF SHARED CLOUD EXECUTED MINI-GAMES AND TAG SHARING CONTROLS," filed on Feb. 27, 2013, the disclosure of which is hereby incorporated by reference in its entirety. This application is related to commonly assigned, U.S. patent application Ser. No. 13/792,664, entitled "USER-BASED MINI-GAME GENERATION AND DISTRIBUTION," filed on Mar. 11, 2013, the disclosure of which is hereby incorporated by reference in its entirety. This application is related to commonly assigned U.S. Pat. No. 8,870,661, entitled "CLOUD-BASED GAME SLICE GENERATION AND FRICTIONLESS SOCIAL SHARING WITH INSTANT PLAY," filed on Mar. 12, 2013, the disclosure of which is hereby incorporated by reference in its entirety. This application is related to commonly assigned, U.S. patent application Ser. No. 13/844,558, entitled "Systems and Methods for Managing Video Game Titles and User Play Metrics for Video Game Titles Executing on a Game Cloud System," filed on Mar. 15, 2013, the disclosure of which is hereby incorporated by reference in its entirety. This application is related to commonly assigned, U.S. patent application Ser. No. 14/526,472, entitled "CLOUD-BASED GAME SLICE GENERATION AND FRICTIONLESS SOCIAL SHARING WITH INSTANT PLAY," filed on Oct. 28, 2014, the disclosure of which is hereby incorporated by reference in its entirety.

TECHNICAL FIELD

The present disclosure is related to video games or gaming applications. Among other things, this disclosure describes methods and systems for connecting a mobile device to a gaming console over a wireless network for streaming a user interface to the mobile device without requiring application install.

BACKGROUND OF THE DISCLOSURE

Video gaming has increasingly become more popular with the advancement of video game technology. For example, high powered graphics processors provide an unbelievably viewing and interactive experience when playing a video game. In addition, cloud-based systems may provide unlimited processing power for execution of video games, and an overwhelming breadth of legacy and new video games for playing. These cloud-based systems enable streaming of content to remote clients, wherein most processing is done on servers, which may be distributed. Cloud-based gaming, therefore, has been increasing in popularity because users find it easier to access more video game titles without complex hardware restrictions, and game suppliers find it easier to manage game code from centralized locations.

A user may be playing a gaming application, wherein information associated with the game play may be presented to the user over multiple devices. The user may go through a lengthy process to register each of the devices. Once registered, the user is able to access all the information on the various devices in order to advance the game play or to enhance the user experience during the game play.

Moreover, many times the user is playing the gaming application in a setting with multiple persons, such as friends of the user all gathered in a room. The friends typically do not participate in the game play of the user, and are spectators watching the game play as presented on a main display. This is analogous to spectators at a sporting event who are reacting to the actions in the event, but are not participating in the event.

Beyond mere spectating, the friends can participate in the game play by viewing information on one of the multiple devices involved in presenting information associated with the game play. Because the user owns these devices, the user may not want to allow a friend access to any of the multiple devices in order to control access of those multiple devices. For example, the user may not want the friend to peer at private information (e.g., text messages, photos, etc.) stored on a device of the user. One typical solution would be to register a device belonging to the friend in association with the other devices presenting the information associated with the game play. In addition, an application would be installed on the device to receive and display information. However, registering a device owned by a friend may involve a lengthy and difficult process, including application install, leading the user to think twice before beginning the registration process. Without registering the device and/or installation of the application, the friend remains a spectator of the game play of the user.

It would be beneficial to allow for multiple persons (e.g., friends) to participate in the game play of a user.

It is in this context that embodiments of the disclosure arise.

SUMMARY

Embodiments of the present disclosure relate to providing information complementing and/or supporting game play of a first user playing a gaming application to a device of a second user over a wireless network, wherein the device of the second user is paired to a gaming console broadcasting a network identifier in order to stream a user interface to the device of the second user without requiring application install. The user interface can be used to interact with the gaming console and/or the gaming application directly from the device of the second user. For example, a mobile device of the second user connects to Wi-Fi service set identifier (SSID) generated by the gaming console itself. The connection establishes a local area network between the gaming console and the second device. The gaming console can then stream a rich user interface to the second device. Interaction by the second user with the user interface enables control of the game play (e.g., through controlling execution of the gaming application) or gaming console directly, with virtually zero latency. As such, any device of any user could instantly become a second screen for a gaming console, game play, or gaming application, without installing anything (e.g., customized application), or even needing any storage space available on the second device. Several inventive embodiments of the present disclosure are described below.

In one embodiment, a method for communication between devices in association with playing a gaming application is disclosed. The method includes presenting game play of a first user playing a gaming application on a display. The method includes broadcasting a service set identifier (SSID) from a first device over a wireless local area network. For example, the first device may be a gaming console. The method includes pairing the first device and a second device associated with a second user over the wireless local area network. The method includes streaming a user interface (e.g., companion interface) including information related to the first game play from the first device to the second device. The user interface is streamed concurrent with the game play of the first user, and the user interface is configured to complement and/or support game play of the first user. In that manner, the second user is able to participate in the game play of the first user.

In another embodiment, a non-transitory computer-readable medium storing a computer program for providing communication between devices in association with playing a gaming application is disclosed. The computer-readable medium includes program instructions for presenting game play of a first user playing a gaming application on a display. The computer-readable medium includes program instructions for broadcasting a service set identifier (SSID) from a first device over a wireless local area network. For example, the first device may be a gaming console. The computer-readable medium includes program instructions for pairing the first device and a second device associated with a second user over the wireless local area network. The computer-readable medium includes program instructions for streaming a use interface (e.g., companion interface) including information related to the first game play from the first device to the second device. The user interface is streamed concurrent with the game play of the first user, and the user interface is configured to complement and or support game play of the first user. In that manner, the second user is able to participate in the game play of the first user.

In still another embodiment, a computer system is disclosed. The computer system including a processor and memory, wherein the memory is coupled to the processor and having stored therein instructions that, if executed by the computer system, cause the computer system to execute a method for communication between devices in association with playing a gaming application is disclosed. The method includes presenting game play of a first user playing a gaming application on a display. The method includes broadcasting a service set identifier (SSID) from a first device over a wireless local area network. For example, the first device may be a gaming console. The method includes pairing the first device and a second device associated with a second user over the wireless local area network. The method includes streaming a user interface (e.g., companion interface) including information related to the first game play from the first device to the second device. The user interface is streamed concurrent with the game play of the first user, and the user interface is configured to complement and/or support game play of the first user. In that manner, the second user is able to participate in the game play of the first user.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
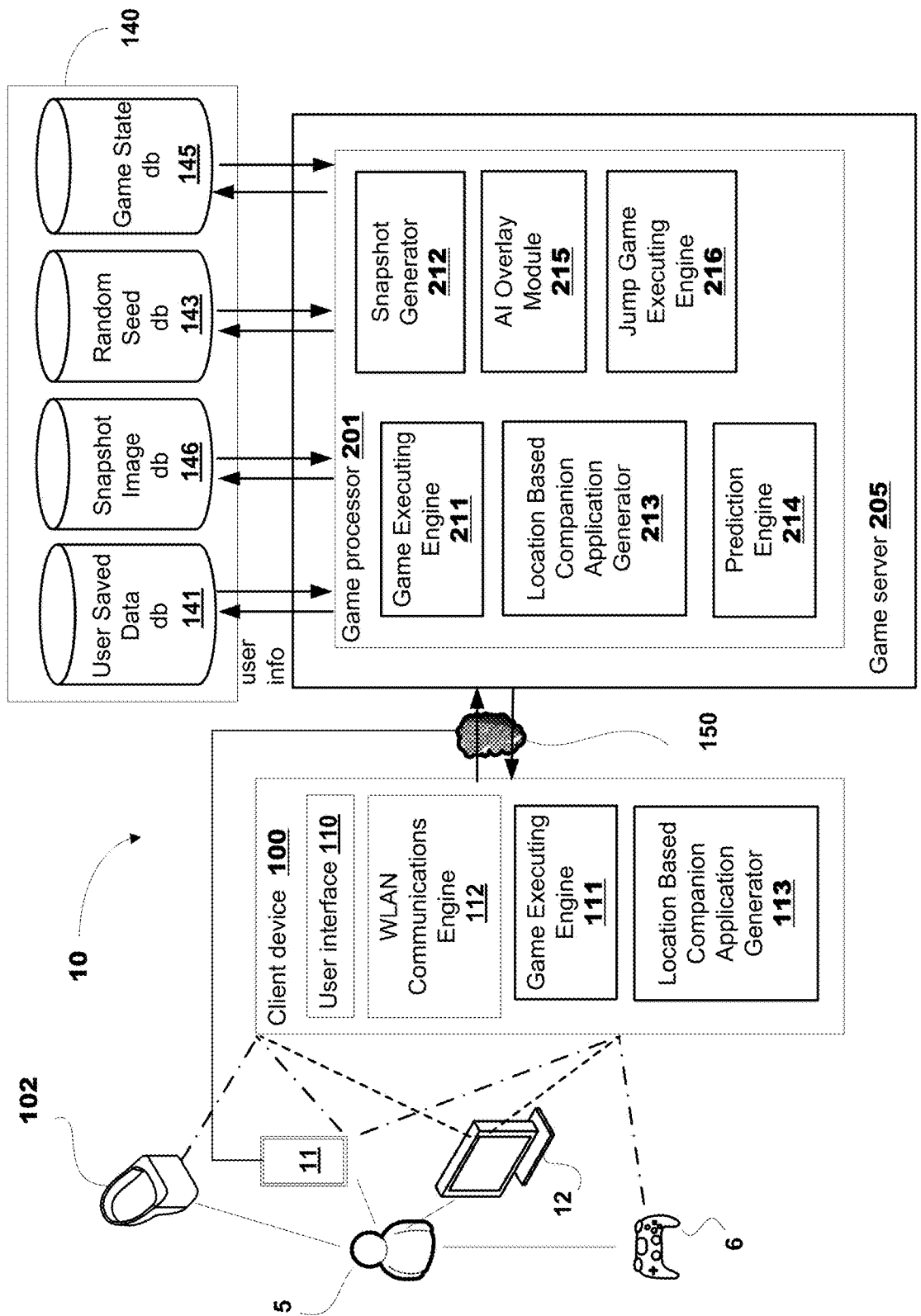
FIG. 1A illustrates a system used for implementing a location based companion interface complementing game play of a corresponding user playing a gaming application, and for providing information complementing game play of a first user playing a gaming application to a device of a second user over a wireless network via a user interface that is streamed to the device of the second user without requiring application install, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing information complementing game play of a first user playing a gaming application to a device of a second user over a wireless network, wherein the device of the second user is paired to a gaming console broadcasting a network identifier in order to stream a user interface to the device of the second user without requiring application install. For example, a mobile device of a second user is connected and/or paired to a Wi-Fi SSID (service set identifier) that is generated by a gaming console. Once paired, a rich, mobile user interface (UI) can be streamed to the mobile device without requiring installation of an application on the mobile device. From the mobile device, this UI can be used to interact with the gaming console and/or the gaming application executing on the console or back end gaming server. In that manner, the second user is able to participate in the game play of the first user playing the gaming application. For example, information presented in the UI and available to the second user can be delivered to the first user (e.g., audibly) who is controlling the game play in real time. Throughout the specification, the term companion application is used to reference in general a "user interface" or "interface" that complements game play of a user playing a gaming application. That is, the companion application may be configured as any type of interface and include any type of information that can complement the game play of a corresponding user.

The user interface may be provided within a location based companion interface that is configured to complement game play of the first user. As a result, embodiments of the present disclosure provide for additional uses of a gaming application through a location based companion interface. In one embodiment, the companion interface includes contextually relevant information (e.g., messaging, assistance information, etc.) that is generated based on a location of a character in the game play of the first user. The information is based on snapshots collected periodically during the game play of one or more users, wherein a snapshot contains metadata and/or information about the game play of the corresponding user, and is configurable to enable another instance of a corresponding gaming application at a jump point in the gaming application corresponding to the snapshot.

The location based information includes defining parameters generated for snapshots collected periodically during the game play of a corresponding user (e.g., first user). In particular, a snapshot contains metadata and/or information about the game play of the first user, and is configurable to enable another instance of a corresponding gaming application at a jump point in the gaming application corresponding to the snapshot. The contextually relevant information also includes information collected during that game plays of other users playing the same gaming application. In that manner, a viewer of the companion interface (e.g., first or second user) is able to receive contextually relevant information based on the current progress of the first user (e.g., location in gaming world, etc.). For example, the contextually relevant information can provide assistance in the game play of the first user, wherein the information may be based on game play location, past game play, and anticipated game play. In one use case, the second user is able to direct the game play of the first user based on the contextually relevant information presented in the companion interface.

With the above general understanding of the various embodiments, example details of the embodiments will now be described with reference to the various drawings.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system 10 used for implementing a location based companion interface configured to complement game play of a user playing a gaming application, in accordance with one embodiment of the present disclosure. For example, the companion interface may be used for providing information and/or creating content (e.g., quests and/or challenges, etc.) for interaction by other users playing the gaming application. The gaming application can be executing on a local computing device or over a cloud game network, in accordance with one embodiment of the present disclosure.

In addition, system 10 may be configured to provide information complementing game play of a first user playing the gaming application to a device (not shown) of a second user over a wireless network, wherein the information may be provided within a user interface (e.g., companion interface) that is streamed to the device of the second user without requiring application install. The streaming of the user interface to the device of the second user is more fully described in relation to FIGS. 3A-3C and 4A-4B, described below.

As shown in FIG. 1A, the gaming application may be executing locally at a client device 100 of the user 5 (e.g., at the game executing engine 111), or may be executing at a back-end game executing engine 211 operating at a back-end game server 205 of a cloud game network or game cloud system. The game executing engine 211 may be operating within one of many game processors 201 of game server 205. In either case, the cloud game network is configured to provide a location based companion interface complementing the game plays of one or more users playing a gaming application. Further, the gaming application may be executing in a single-player mode, or multi-player mode, wherein embodiments of the present invention provide for multi-player enhancements (e.g., assistance, communication, etc.) to both modes of operation. Also, game play of the gaming application may be presented within a VR viewing environment as implemented through an HMD 102.

In some embodiments, the cloud game network may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor module 201 that provides access to a plurality of interactive gaming applications. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5. For example, game server is configurable to provide a companion interface displayable to user 5 for purposes of generating and/or receiving contextually relevant information, as will be further described below.

Client device 100 is configured for requesting access to a gaming application over a network 150, such as the internet, and for rendering instances of video games or gaming applications executed by the game server 205 and delivered to the display device 12 associated with a user 5. For example, user 5 may be interacting through client device 100 with an instance of a gaming application executing on game processor 201. Client device 100 may also include a game executing engine 111 configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game.

Client device 100 is configured for receiving rendered images, and for displaying the rendered images on display 12 and/or HMD 102 (e.g., displaying VR content). For example, through cloud based services the rendered images may be delivered by an instance of a gaming application executing on game executing engine 211 of game server 205 in association with user 5. In another example, through local game processing, the rendered images may be delivered by the local game executing engine 111. In either case, client device 100 is configured to interact with the executing engine 211 or 111 in association with the game play of user 5, such as through input commands that are used to drive game play. In another implementation, the rendered images may be streamed to a smartphone or tablet, wirelessly or wired, direct from the cloud based services or via the client device 100 (e.g., PlayStation® Remote Play).

Further, client device 100 is configured to interact with the game server 205 to capture and store snapshots of the game play of user 5 when playing a gaming application, wherein each snapshot includes information (e.g., game state, etc.) related to the game play. For example, the snapshot may include location based information corresponding to a location of a character within a gaming world of the game play of the user 5. Further, a snapshot enables a corresponding user to jump into a saved game play at a jump point in the gaming application corresponding to the capture of the snapshot. As such, user 5 can jump into his or her own saved game play at a jump point corresponding to a selected snapshot, another user may jump into the game play of the user 5, or user 5 may jump into the saved game play of another user at a jump point corresponding to a selected snapshot. Further, client device 100 is configured to interact with game server 205 to display a location based companion interface from the companion interface generator 213, wherein the companion interface is configured to receive and/or generate contextually relevant content, such as assistance information, messaging, interactive quests and challenges, etc. In another embodiment, the companion interface generator 113 is local to the user 5. In particular, information contained in the snapshots captured during the game play of user 5, such as location based information relating to the game play, as well as information captured during game plays of other users, is used to generate the contextually relevant content.

More particularly, game processor 201 of game server 205 is configured to generate and/or receive snapshots of the game play of user 5 when playing the gaming application. For instance, snapshots may be generated by the local game execution engine 111 on client device 100, outputted and delivered over network 150 to game processor 201. In addition, snapshots may be generated by game executing engine 211 within the game processor 201, such as by an instance of the gaming application executing on engine 211. In addition, other game processors of game server 205 associated with other virtual machines are configured to execute instances of the gaming application associated with game plays of other users and to capture snapshots during those game play, wherein this additional information may be used to create the contextually relevant information.

Snapshot generator 212 is configured to capture a plurality of snapshots generated from the game play of user 5. Each snapshot provides information that enables execution of an instance of the video game beginning from a point in the video game associated with a corresponding snapshot. The snapshots are automatically generated during game play of the gaming application by user 5. Portions of each of the snapshots are stored in relevant databases independently configured or configured under data store 140, in embodiments. In another embodiment, snapshots may be generated manually through instruction by user 5. In that manner, any user through selection of a corresponding snapshot may jump into the game play of user 5 at a point in the gaming application associated with the corresponding snapshot. In addition, snapshots of game plays of other users playing a plurality of gaming applications may also be captured. As such, game processor 201 is configured to access information in database 140 in order to enable the jumping into a saved game play of any user based on a corresponding snapshot. That is, the requesting user is able to begin playing the video game at a jump point corresponding to a selected snapshot using the game characters of the original user's game play that generated and saved the snapshot.

A full discussion on the creation and use of snapshots is provided within U.S. application Ser. No. 15/411,421, entitled "Method And System For Saving A Snapshot of Game Play And Used To Begin Later Execution Of The Game Play By Any User As Executed On A Game Cloud System," which was previously incorporated by reference in its entirety. A brief description of the creation and implementation of snapshots follows below.

In particular, each snapshot includes metadata and/or information to enable execution of an instance of the gaming application beginning at a point in the gaming application corresponding to the snapshot. For example, in the game play of user 5, a snapshot may be generated at a particular point in the progression of the gaming application, such as in the middle of a level. The relevant snapshot information is stored in one or more databases of database 140. Pointers can be used to relate information in each database corresponding to a particular snapshot. In that manner, another user wishing to experience the game play of user 5, or the same user 5 wishing to re-experience his or her previous game play, may select a snapshot corresponding to a point in the gaming application of interest.

The metadata and information in each snapshot may provide and/or be analyzed to provide additional information related to the game play of the user. For example, snapshots may help determine where the user (e.g., character of the user) has been within the gaming application, where the user is in the gaming application, what the user has done, what assets and skills the user has accumulated, and where the user will be going within the gaming application. This additional information may be used to generate quests and/or challenges that are based on the game play of the user, wherein the quests and/or challenges are not contained within the gaming application. For example, the user may define asset and achievement parameters (e.g., negative and positive) that create a quest and/or challenge that mimic the user's game play (e.g., beating the boss using minimal weaponry). The user may challenge other users to try and beat the quest (e.g., beating the boss) with the same constraints (e.g., minimal weaponry).

The snapshot includes a snapshot image of the scene that is rendered at that point. The snapshot image is stored in snapshot image database 146. The snapshot image presented in the form of a thumbnail in a timeline provides a view into the game play of a user at a corresponding point in the progression by the user through a video game, in one embodiment.

More particularly, the snapshot also includes game state data that defines the state of the game at that point. For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at the point corresponding to the snapshot. The game state data is stored in game state database 145.

The snapshot also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the user 5 when playing the game, game level, character attributes, character location, number of lives left, the total possible number of lives available, armor, trophy, time counter values, and other asset information, etc. User saved data may also include user profile data that identifies user 5, for example. User saved data is stored in database 141.

In addition, the snapshot also includes random seed data that is generated by artificial intelligence (AI) module 215. The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. As an illustration, these AI characters may randomly walk the streets in a city scene. In addition, other objects maybe generated and presented in an overlay. For instance, clouds in the background and birds flying through space may be generated and presented in an overlay. The random seed data is stored in random seed database 143.

In that manner, another user wishing to experience the game play of user 5 may select a snapshot corresponding to a point in the video game of interest. For example, selection of a snapshot image presented in a timeline or node in a node graph by a user enables the jump executing engine 216 of game processor 201 to access the corresponding snapshot, instantiate another instance of the video game based on the snapshot, and execute the video game beginning at a point in the video game corresponding to the snapshot. In that manner, the snapshot enables the requesting user to jump into the game play of user 5 at the point corresponding to the snapshot. In addition, user 5 may access game plays of other users or even access his or her own prior game play in the same or other gaming application using corresponding snapshots. In particular, selection of the snapshot by user 5 (e.g., in a timeline, or through a message, etc.) enables executing engine 216 to collect the snapshot (e.g., metadata and/or information) from the various databases (e.g., from database 140) in order to begin executing the corresponding gaming application at a point where the corresponding snapshot was captured in a corresponding gaming application.

Game processor 201 includes a location based companion application generator 213 configured to generate a companion interface complementing the game play of user 5 when playing a gaming application, in one embodiment. In another embodiment, a companion application generator 113 similarly configured is local to user 5. In either case, the generator 213 or 113 can be used to create contextually relevant information (e.g., assistance information, messages, etc.) to be delivered to or received from user 5 that is based on the game play of the user 5, wherein the contextually relevant information is created using location based information (e.g., snapshots). The contextually relevant information may also be based on information collected from game plays of other users playing the gaming application. For example, in embodiments the location based information may be based on current and/or past game plays of multiple users playing the same gaming application in a crowd sourcing environment, such that the information may be determined through observation and/or analysis of the multiple game plays. In that manner, crowdsourced content may be discovered during the game plays, wherein the content may be helpful for other players playing the same gaming application, or provide an enhanced user experience to those other players. The contextually relevant information may be generated from friends of the user. The user may be playing the gaming application in isolation (e.g., playing alone), and receiving information through the companion interface that is helpful in advancing the game play of the first user, or for providing an enhanced user experience. The user may be playing with a group of friends all playing the gaming application simultaneously (e.g., in isolation or multi-player mode), wherein the information provides real-time interaction between the friends.

In particular, generator 213 or 113 is configurable to determine progress of the game play of user 5 for a particular gaming application (e.g., based on snapshots) for a particular context of the game play (e.g., current location of character, game state information, etc.), and determine contextually relevant information that may be delivered to a companion interface displayable on device 11 that is separate from a device displaying the game play of user 5. For example, the contextually relevant information may provide information providing assistance in progressing through the gaming application. The contextually relevant information may consider information provided by a prediction engine 214 that is configured to predict where the game play of user 5 will go, to include what areas a character will visit, what tasks are required to advance the game play, what assets are needed in order to advance the game play (e.g., assets needed to accomplish a required task), etc.

In one embodiment, the companion interface is delivered to a device 11 (e.g., tablet) for display and interaction, wherein device 11 may be separate from client device 100 that is configured to execute and/or support execution of the gaming application for user 5 interaction. For instance, a first communication channel may be established between the game server 205 and client device 100, and a separate, second communication channel may be established between game server 205 and device 11. In another embodiment, the secondary information (e.g., companion interface) is delivered to an HMD 102 for display and interaction.

In another embodiment, the companion interface including the contextually relevant content may be streamed to a device of a second user over a wireless network as facilitated by wireless local area network (WLAN) communications engine 112, wherein the device of the second user is paired to a gaming console (e.g., client device 100) broadcasting a network identifier in order to stream a user interface (e.g., companion interface) to the device of the second user without requiring application install. In that manner, the second user is able to participate in the game play of user 5 playing the gaming application.

Figure 1B:
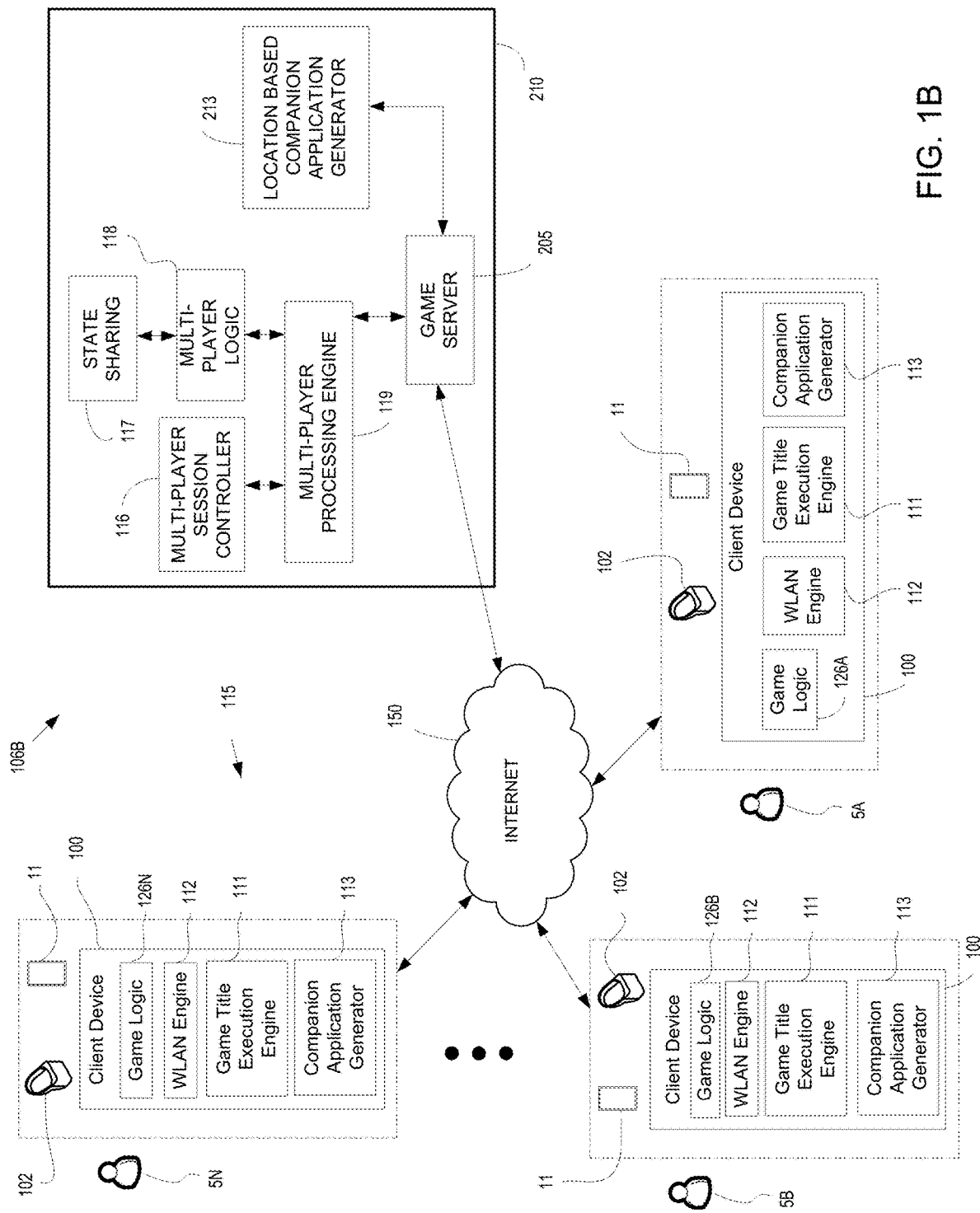
FIG. 1B illustrates a system providing gaming control to one or more users playing one or more gaming applications that are executing locally to the corresponding user, wherein information complementing game play of a first user playing a gaming application is provided to a device of a second user over a wireless network via a user interface that is streamed to the device of the second user without requiring application install, in accordance with one embodiment of the present disclosure.

FIG. 1B illustrates a system 106B providing gaming control to one or more users playing one or more gaming applications that are executing locally to the corresponding user, and wherein back-end server support (e.g., accessible through game server 205) may implement a location based companion interface complementing game play of a corresponding user, in accordance with one embodiment of the present disclosure. In addition, system 106B may be configured to provide information complementing game play of a first user playing the gaming application to a device (not shown) of a second user over a wireless network, wherein the information may be provided within a user interface (e.g., companion interface) that is streamed to the device of the second user without requiring application install. In one embodiment, system 106B works in conjunction with system 10 of FIG. 1A and system 200 of FIG. 2 to implement the location based companion interface complementing game play of a corresponding user, and wherein not all components are shown for clarity. Referring now to the drawings, like referenced numerals designate identical or corresponding parts.

As shown in FIG. 1B, a plurality of users 115 (e.g., user 5A, user 5B . . . user 5N) is playing a plurality of gaming applications, wherein each of the gaming applications is executed locally on a corresponding client device 100 (e.g., game console) of a corresponding user. In addition, each of the plurality of users 115 has access to a device 11, previously introduced, configured to receive and/or generate a companion interface for display, wherein the companion interface provides secondary information (e.g., contextually relevant information) for a corresponding user playing a corresponding gaming application, as previously described. Further, the companion interface may be streamed to a device of a second user without requiring application install, so that the second user is able to participate in the game play of a corresponding user who is playing a gaming application.

Each of the client devices 100 may be configured similarly in that local execution of a corresponding gaming application is performed. For example, user 5A may be playing a first gaming application on a corresponding client device 100, wherein an instance of the first gaming application is executed by a corresponding game title execution engine 111. Game logic 126A (e.g., executable code) implementing the first gaming application is stored on the corresponding client device 100, and is used to execute the first gaming application. For purposes of illustration, game logic may be delivered to the corresponding client device 100 through a portable medium (e.g., flash drive, compact disk, etc.) or through a network (e.g., downloaded through the internet 150 from a gaming provider). In addition, user 5B is playing a second gaming application on a corresponding client device 100, wherein an instance of the second gaming application is executed by a corresponding game title execution engine 111. The second gaming application may be identical to the first gaming application executing for user 5A or a different gaming application. Game logic 126B (e.g., executable code) implementing the second gaming application is stored on the corresponding client device 100 as previously described, and is used to execute the second gaming application. Further, user 115N is playing an Nth gaming application on a corresponding client device 100, wherein an instance of the Nth gaming application is executed by a corresponding game title execution engine 111. The Nth gaming application may be identical to the first or second gaming application, or may be a completely different gaming application. Game logic 126N (e.g., executable code) implementing the third gaming application is stored on the corresponding client device 100 as previously described, and is used to execute the Nth gaming application.

As previously described, client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Also, client device 100 of a corresponding user is configured for generating rendered images executed by the game title execution engine 111 executing locally or remotely, and for displaying the rendered images on a display (e.g., display 11, HMD 102, etc.). For example, the rendered images may be associated with an instance of the first gaming application executing on client device 100 of user 5A. For example, a corresponding client device 100 is configured to interact with an instance of a corresponding gaming application as executed locally or remotely to implement a game play of a corresponding user, such as through input commands that are used to drive game play.

In one embodiment, client device 100 is operating in a single-player mode for a corresponding user that is playing a gaming application. Back-end server support via the game server 205 may provide location based companion interface services complementing game play of a corresponding user, as will be described below, in accordance with one embodiment of the present disclosure.

In another embodiment, multiple client devices 100 are operating in a multi-player mode for corresponding users that are each playing a specific gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 119 communicates with the multi-player session controller 116, which is configured to establish and maintain communication sessions with each of the users and/or players participating in the multi-player gaming session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1A and FIG. 2, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115A when playing the game, game level, character attributes, character location, number of lives left, the total possible number of lives available, armor, trophy, time counter values, etc. User saved data may also include user profile data that identifies a corresponding user 115A, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. In another embodiment, the companion application generator 113 is local to user 5, and is similarly configured. As previously introduced, generator 213 and/or 113 is configured to create secondary information, including contextually relevant information (e.g., assistance information, messages, etc.), to be delivered to or received from user 5. The information may be generated based on the game play of user 5 for a particular application (e.g., based on information provided in snapshots). In that manner, generator 213 or 113 is able to determine the context of the game play of user 5 and provide contextually relevant information that is deliverable to a comp interface displayable on device 11 (e.g., separate from the device displaying game play of user 5), or HMD 102 (concurrent with display of the game play of user 5). As previously introduced, the companion interface that is generated locally or remotely at a back end gaming server in association with game play of a first user may be streamed to a device of a second user over a wireless network as facilitated by a corresponding WLAN communications engine 112, wherein the device of the second user is paired to a corresponding gaming console (e.g., client device 100) broadcasting a network identifier in order to stream a user interface (e.g., companion interface) to the device of the second user without requiring application install. In that manner, the second user is able to participate in the game play of the first user playing the gaming application.

Figure 1C:
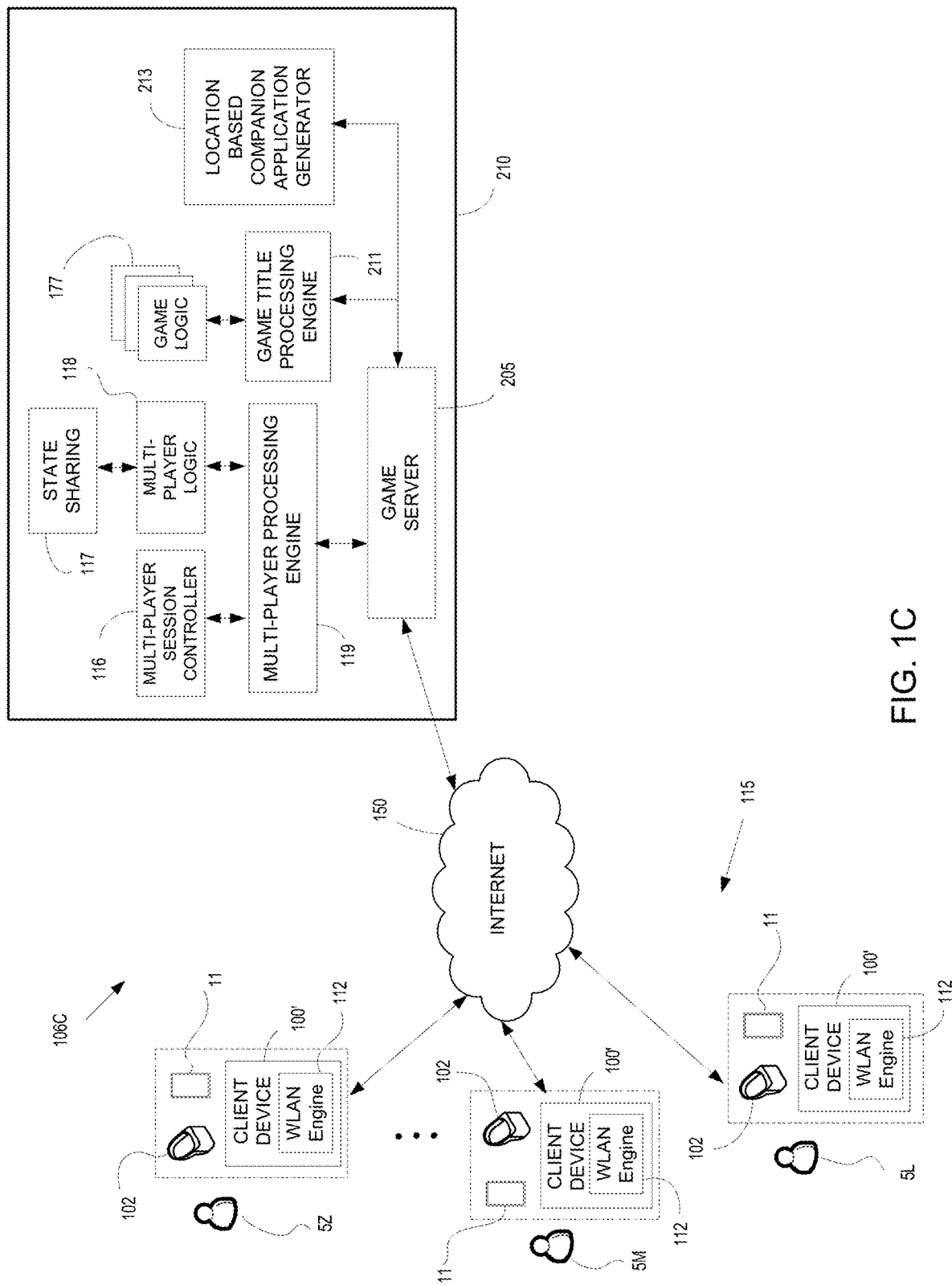
FIG. 1C illustrates a system providing gaming control to one or more users playing a gaming application as executed over a cloud game network, and wherein back-end server support may implement a location based companion interface complementing game play of a corresponding user that is located in a peripheral zone of the corresponding user, and wherein information complementing game play of a first user playing a gaming application is provided to a device of a second user over a wireless network via a user interface that is streamed to the device of the second user without requiring application install, in accordance with one embodiment of the present disclosure.

FIG. 1C illustrates a system 106C providing gaming control to one or more users 115 (e.g., users 5L, 5M ... 5Z) playing a gaming application in respective VR viewing environments as executed over a cloud game network, and wherein back-end server support may implement a location based companion interface complementing game play of a corresponding user that is located in a peripheral zone of the corresponding user, and wherein attention of the user is directed to the peripheral zone when new information or data is available for viewing, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In addition, system 106C may be configured to provide information complementing game play of a first user playing the gaming application to a device (not shown) of a second user over a wireless network, wherein the information may be provided within a user interface (e.g., companion interface) that is streamed to the device of the second user without requiring application install. In one embodiment, system 106C works in conjunction with system 10 of FIG. 1A and/or system 200 of FIG. 2 to implement the location based companion interface complementing game play of a corresponding user. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of gaming applications to a plurality of corresponding users.

A plurality of users 115 accesses the game cloud system 210 via network 150, wherein users (e.g., users 5L, 5M .. . 5Z) access network 150 via corresponding client devices 100', wherein client device 100' may be configured similarly as client device 100 of FIGS. 1A-1B (e.g., including game executing engine 111, etc.), or may be configured as a thin client providing that interfaces with a back end server providing computational functionality (e.g., including game executing engine 211). In addition, each of the plurality of users 115 has access to a device 11, previously introduced, configured to receive and/or generate a companion interface for display that provides contextually relevant information of a corresponding user playing a corresponding gaming application, as previously described. Moreover, the contextually relevant information associated with game play of a first user may be streamed to a device of a second user over a wireless network as facilitated by a corresponding WLAN communications engine 112, wherein the device of the second user is paired to a corresponding client device of the first user (e.g., gaming console) broadcasting a network identifier in order to stream a companion interface to the device of the second user without requiring application install. In that manner, the second user is able to participate in the game play of first user.

In particular, a client device 100' of a corresponding user 5L is configured for requesting access to gaming applications over a network 150, such as the internet, and for rendering instances of gaming application (e.g., video game) executed by the game server 205 and delivered to a display device associated with the corresponding user 5L. For example, user 5L may be interacting through client device 100' with an instance of a gaming application executing on game processor of game server 205. More particularly, an instance of the gaming application is executed by the game title execution engine 211. Game logic (e.g., executable code) implementing the gaming application is stored and accessible through data store 140, previously described, and is used to execute the gaming application. Game title processing engine 211 is able to support a plurality of gaming applications using a plurality of game logics 177, as shown.

As previously described, client device 100' may receive input from various types of input devices, such as game controllers, tablet computers, keyboards, gestures captured by video cameras, mice touch pads, etc. Client device 100' can be any type of computing device having at least a memory and a processor module that is capable of connecting to the game server 205 over network 150. Also, client device 100' of a corresponding user is configured for generating rendered images executed by the game title execution engine 211 executing locally or remotely, and for displaying the rendered images on a display. For example, the rendered images may be associated with an instance of the first gaming application executing on client device 100' of user 5L. For example, a corresponding client device 100' is configured to interact with an instance of a corresponding gaming application as executed locally or remotely to implement a game play of a corresponding user, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user 115A at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. In another embodiment, the companion application generator 113 is local to user 5, and is similarly configured. As previously introduced, generator 213 and/or 113 are configured to create contextually relevant information (e.g., assistance information, messages, etc.) to be delivered to or received from a corresponding user (e.g., user 5L). The information is generated based on the game play of the user for a particular application (e.g., based on information provided in snapshots). In that manner, generator 213 and/or 113 is able to determine the context of the game play of the corresponding user and provide contextually relevant information that is deliverable to a companion interface displayable on device 11 (e.g., separate from the device displaying game play of user 5L) and/or HMD 102 (e.g., concurrent with display of the game play of user 5). As previously described, the companion interface that is generated locally or remotely at a back end gaming server in association with game play of a first user may be streamed to a device of a second user over a wireless network as facilitated by a corresponding WLAN communications engine 112, to promote multi-user participation in the game play of a first user playing the gaming application.

Figure 2:
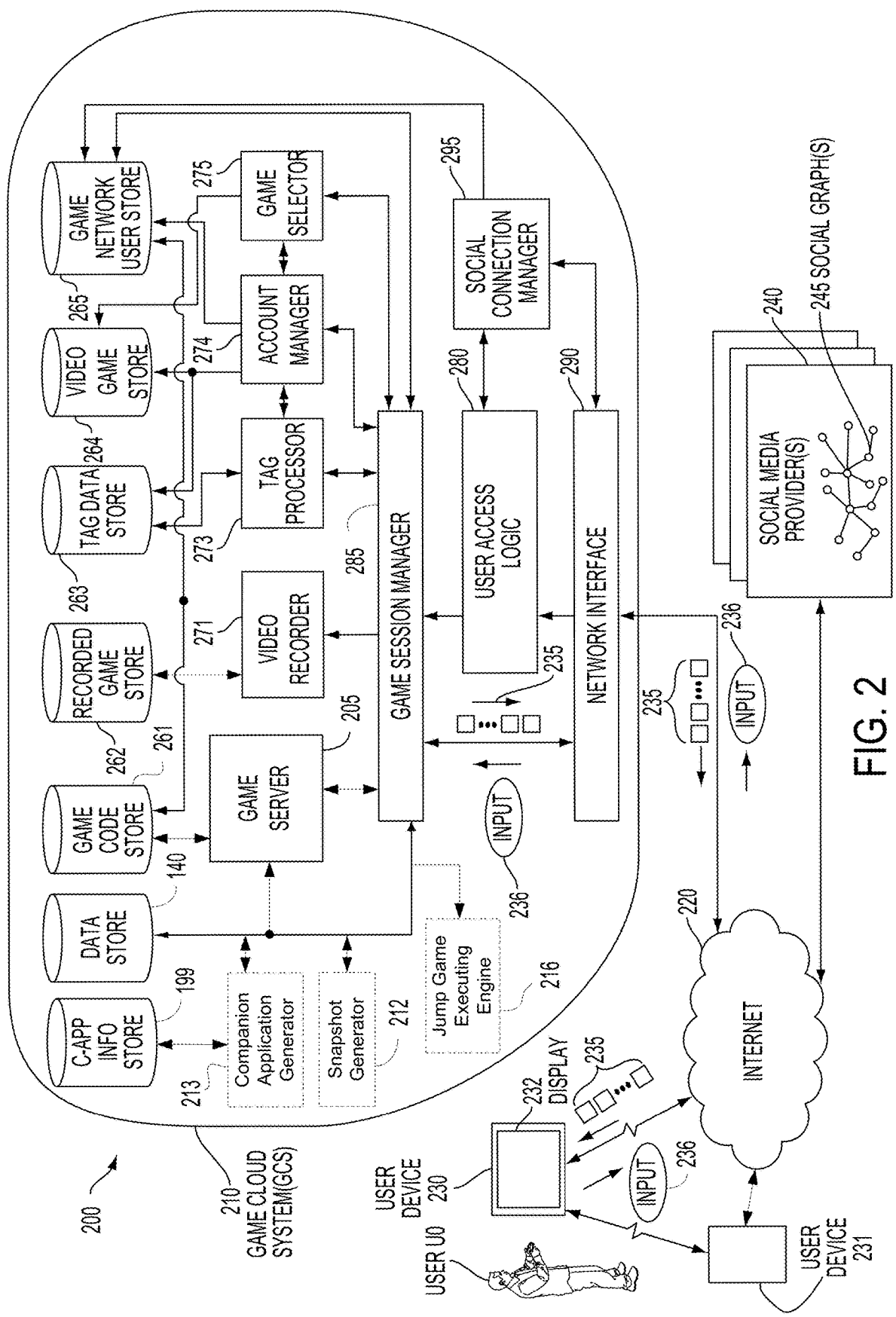
FIG. 2 illustrates a system diagram for enabling access and playing of gaming applications in a game cloud system (GCS), and implementation of a location based companion interface complementing game play of a corresponding user, wherein information complementing game play of a first user playing a gaming application is provided to a device of a second user over a wireless network via a user interface that is streamed to the device of the second user without requiring application install, in accordance with one embodiment of the present disclosure.

FIG. 2 illustrates a system diagram 200 for enabling access and playing of gaming applications stored in a game cloud system (GCS) 210, in accordance with an embodiment of the disclosure. Generally speaking, game cloud system GCS 210 may be a cloud computing system operating over a network 220 to support a plurality of users. Additionally, GCS 210 is configured to save snapshots generated during game plays of a gaming application of multiple users, wherein a snapshot can be used to initiate an instance of the gaming application for a requesting user beginning at a point in the gaming application corresponding to the snapshot. For example, snapshot generator 212 is configured for generating and/or capturing snapshots of game plays of one or more users playing the gaming application. The snapshot generator 212 may be executing external or internal to game server 205. In addition, GCS 210 through the use of snapshots enables a user to navigate through a gaming application, and preview past and future scenes of a gaming application. Further, the snapshots enable a requesting user to jump to a selected point in the video game through a corresponding snapshot to experience the game play of another user. Also, GCS may be configured to generate a companion interface that is generated locally or remotely at a back end gaming server in association with game play of a first user (e.g., user $U_0$), wherein the companion interface may be streamed to a device of a second user over a wireless network as facilitated by a corresponding WLAN communications engine, to promote multi-user participation in the game play of the first user playing the gaming application. More particularly, system 200 includes GCS 210, one or more social media providers 240, and a user device 230, all of which are connected via a network 220 (e.g., internet). One or more user devices may be connected to network 220 to access services provided by GCS 210 and social media providers 240.

In one embodiment, game cloud system 210 includes a game server 205, a video recorder 271, a tag processor 273, and account manager 274 that includes a user profile manager, a game selection engine 275, a game session manager 285, user access logic 280, a network interface 290, and a social media manager 295. GCS 210 may further include a plurality of gaming storage systems, such as a game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 210 is a system that can provide gaming applications, services, gaming related digital content, and interconnectivity among systems, applications, users, and social networks. GCS 210 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User $U_0$ is able to access services provided by GCS 210 via the game session manager 285, wherein user $U_0$ may be representative of user 5 of FIG. 1. For example, account manager 274 enables authentication and access by user $U_0$ to GCS 210. Account manager 274 stores information about member users. For instance, a user profile for each member user may be managed by account manager 274. In that manner, member information can be used by the account manager 274 for authentication purposes. For example, account manager 2274 may be used to update and manage user information related to a member user. Additionally, game titles owned by a member user may be managed by account manager 274. In that manner, gaming applications stored in data store 264 are made available to any member user who owns those gaming applications.

In one embodiment, a user, e.g., user $U_0$, can access the services provided by GCS 210 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for user $U_0$ to send input commands 236 and display data and/or information 235 received from GCS 210 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer. In still another alternative embodiment, user device 230 can have an HMD providing display capabilities to present main content in an active zone of a VR viewing environment and secondary content in a peripheral zone outside of the active zone. Additional devices 231 (e.g., device 11 of FIG. 1A) may be available to user $U_0$ for purposes of implementing a location based companion interface.

In one embodiment, user device 130 is configured to communicate with GCS 210 to enable user $U_0$ to play a gaming application. In some embodiments, the GCS 210 may include a plurality of virtual machines (VMs) running on a hypervisor of a host machine, with one or more virtual machines configured to execute a game processor module utilizing the hardware resources available to the hypervisor of the host. For example, user $U_0$ may select (e.g., by game title, etc.) a gaming application that is available in the video game data store 264 via the game selection engine 275. The gaming application may be played within a single player gaming environment or in a multi-player gaming environment. In that manner, the selected gaming application is enabled and loaded for execution by game server 205 on the GCS 210. In one embodiment, game play is primarily executed in the GCS 210, such that user device 230 will receive a stream of game video frames 235 from GCS 210, and user input commands 236 for driving the game play is transmitted back to the GCS 210. The received video frames 235 from the streaming game play are shown in display 232 of user device 230. In other embodiments, the GCS 210 is configured to support a plurality of local computing devices supporting a plurality of users, wherein each local computing device may be executing an instance of a gaming application, such as in a single-player gaming application or multi-player gaming application. For example, in a multi-player gaming environment, while the gaming application is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player gaming application. In that manner, the cloud game network coordinates and combines the game plays for each of the users within the multi-player gaming environment.

In one embodiment, after user $U_0$ chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the user $U_0$ can restart game play from a previous game play stop point. Once the resume or start point is identified, the game session manager 285 may inform game execution engine in game processor 201 to execute the game code of the chosen game title from game code store 261. After a game session is initiated, game session manager 285 may pass the game video frames 235 (i.e., streaming video data), via network interface 290 to a user device, e.g., user device 230.

During game play, game session manager 285 may communicate with game processor 201, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

During game play, game session manager 285 may communicate with game processor 201 of game server 205 to deliver and obtain user input commands 236 that are used to influence the outcome of a corresponding game play of a gaming application. Input commands 236 entered by user $U_0$ may be transmitted from user device 230 to game session manager 285 of GCS 210. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a gaming application may be used to enable multiple features that may be available to the user.

Because game plays are executed on GCS 210 by multiple users, information generated and stored from those game plays enable any requesting user to experience the game play of other users, particularly when game plays are executed over GCS 210. In particular, snapshot generator 212 of GCS 210 is configured to save snapshots generated by the game play of users playing gaming applications through GCS 210. In the case of user $U_0$, user device provides an interface allowing user $U_0$ to engage with the gaming application during the game play. Snapshots of the game play by user $U_0$ is generated and saved on GCS 210. Snapshot generator 212 may be executing external to game server 205 as shown in FIG. 2, or may be executing internal to game server 205 as shown in FIG. 1A.

In addition, the information collected from those game plays may be used to generate contextually relevant information provided to user $U_0$ in a corresponding companion application. For example, as previously introduced, companion application generator 213 is configured for implementing a location based companion interface that is configured to support game play of the user $U_0$, wherein the companion interface includes contextually relevant information (e.g., messaging, assistance information, offers of assistance, etc.) that is generated based a location of a character in the game play of user $U_0$. Companion application generator 213 may be executing external to game server 205 as shown in FIG. 2, or may be executing internal to game server 205 as shown in FIG. 1A. In these implementations, the contextually relevant information may be delivered over a network 220 to the user device 231 for display of the companion application interface, including the contextually relevant information. In another embodiment, the companion application generator 213 may be local to the user (e.g., implemented within user device 231) and configured for both generating and displaying the contextually relevant information. In this implementation, the user device 231 may be directly communicating with user device 230 over a local network (or through an external network 220) to implement the companion application interface, wherein the user device 231 may deliver location based information to the user device 231, and wherein device 230 is configured for generating and displaying the companion application interface including the contextually relevant information. In still another embodiment, companion interface including the contextually relevant content may be streamed to a device of a second user over a wireless network, wherein the device of the second user is paired to a client device 100 (e.g., gaming console associated with the first user, user $U_0$) broadcasting a network identifier in order to stream a user interface (e.g., companion interface) to the device of the second user without requiring application install. In that manner, the second user is able to participate in the game play of user $U_0$ playing the gaming application. Further, user device 230 is configured to provide an interface that enables the jumping to a selected point in the gaming application using a snapshot generated in the game play of user $U_0$ or another user. For example, jump game executing engine 216 is configured for accessing a corresponding snapshot, instantiate an instance of the gaming application based on the snapshot, and execute the gaming application beginning at a point in the gaming application corresponding to the snapshot. In that manner, the snapshot enables the requesting user to jump into the game play of the corresponding user at the point corresponding to the snapshot. For instance, user $U_0$ is able to experience the game play of any other user, or go back and review and/or replay his or her own game play. That is, a requesting user, via a snapshot of a corresponding game play, plays the gaming application using the characters used in and corresponding to that game play. Jump game executing engine 216 may be executing external to game server 205 as shown in FIG. 2, or may be executing internal to game server 205 as shown in FIG. 1A.

FIGS. 3-6 are described within the context of a user playing a gaming application, wherein information complementing game play of a first user playing a gaming application may be streamed to a device of a second user over a wireless network, wherein the device of the second user is paired to a gaming console broadcasting a network identifier to stream a user interface (e.g., companion interface) to the device of the second user without requiring application install. In that manner, multiple users may participate in the game play of the first user playing the gaming application. In general, the gaming application may be any interactive game that responds to user input.

FIGS. 3A-3D combined illustrate the simultaneous presentation of game play of a first user 5 on a display 12 and of an interface on a device 311 of a second user 305 that includes information complementing game play of the first user 5 playing a gaming application, wherein the interface is streamed to device 311 without requiring application install. In FIGS. 3A-3D and throughout the specification, the term companion application is used to reference in general the interface that complements game play of a user playing a gaming application. That is, the companion application may be configured as any type of interface and include any type of information that can complement the game play.

Figure 3A:
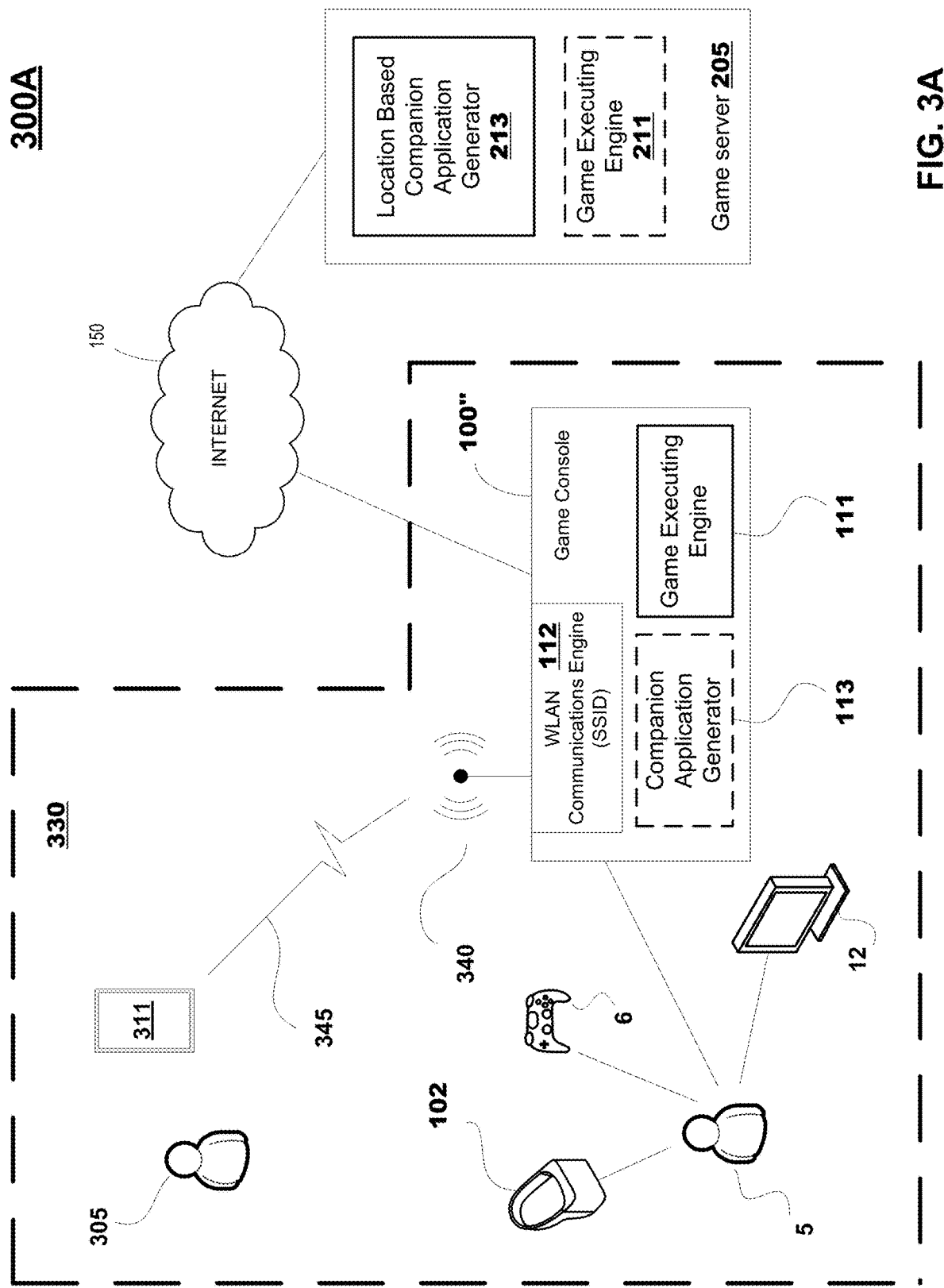
FIG. 3A illustrates a use case illustrating the participation in the game play of a first user by other users (e.g., friends) through the use of information presented in a user interface complementing the game play of the first user that is streamed to a device of a second user over a wireless network without requiring application install, in accordance with one embodiment of the present disclosure.

In particular, FIG. 3A illustrates an exemplary use case illustrating the participation in the game play of a first user by other users (e.g., friends) through the use of information presented in a user interface complementing the game play of the first user (e.g., user 5) that is streamed to a device 311 of a second user 305 over a wireless network without requiring application install, in accordance with one embodiment of the present disclosure. In particular, system 300A may be configured for implementing a location based companion interface that can be used to complement game play of user 5, wherein the companion interface may be streamed to device 311 of the second user 305. In that manner, the second user 305, and other users, may participate in the game play of user 5 playing a gaming application. That is, instead of just sitting and watching the game play of user 5, the friends can actively engage with the gaming application, the game play, and/or user 5. Participation by other users—other than user 5—is enabled through the pairing of devices (e.g., mobile device) of these other users to a console (e.g., gaming console) so that these other users can interact with the console and/or gaming application, in one embodiment.

For example, user 5 may be located in a geographic area 330 with one or more friends, all of which form a group. The second user 305 may be one of the friends of user 5. In a typical scenario the geographic area 330 is the entertainment area (e.g., living room) of one of the group. User 5 may be playing a gaming application, and may be providing input through one or more input devices (e.g., controller 6). In one implementation, as previously described the gaming application may be executing locally (e.g., at game executing engine 111) at the game console 100', which is one implementation of the client device 100 previously introduced. In another implementation, the gaming application may be executing at a back-end game executing engine 211 operating at a back-end game server 205, such as through a cloud game network or game cloud system accessible though network 150, as previously described. Further, the gaming application may be executing in a single-player mode or a multi-player mode.

Rendered images of the game play of user 5 are simultaneously presented on one or more display devices. For example, the rendered images may be presented on display 12, which is viewable by the group (first user 5, second user 305, etc.). In another example, user 5 may be viewing the game play on HMD 102, while the friends (including second user 305) are simultaneously viewing the game play on display 12.

In addition, system 300A is configured to provide contextually relevant information (e.g., assistance information, messages, etc.) that is based on the game play of user 5. For example, the contextually relevant information may be created using in-game location based information (e.g., snapshots) captured during the game play of user 5 and/or game plays of other users playing the gaming application in a crowd sourcing environment. In particular, the contextually relevant information may be generated local to user 5 by the companion application generator 113 at the game console 100", wherein generator 113 is configured to generate the companion interface complementing the game play of user 5 playing a gaming application, as previously described. The contextually relevant information may be created remote from user 5 by the companion application generator 213 at game server 205 and delivered to game console 100", as previously described.

Further, the companion interface created by generator 113 and/or 213 including the contextually relevant information may be streamed to device 311 of the second user 305. In particular, the companion interface is streamed over a WLAN 340 using a wireless connection 345. For instance, WLAN communications engine 112 broadcasts a network identifier (e.g., SSID) from the console 100", wherein device 311 of the second user 305 is able to scan the area 330 for any wireless networks, and upon selection of WLAN 340 is able to pair device 311 and game console 100" and initiate a network connection 345 thereby allowing communication between the two devices over WLAN 340. In one implementation, the SSID is associated with the 802.11 standard and its derivatives, and provides for identification of a wireless network and allows for devices to join the wireless network.

In that manner, the second user 305 is able to participate in the game play of user 5. For example, the companion interface is configured to show real-time assistance and/or help content related to the game play of use 5 (e.g., step-by-step instructions, such as "turn here," or "pick this up," or "use this weapon," etc.). For a more social and participatory experience, second user 305 could pick up device 311 upon which the companion interface is displayed. User 305 could review the information on the companion interface and start guiding user 5 in his or her game play by shouting out real-time verbal instructions (e.g., "Turn right, just past that tree!" or "Pick up the ammo on your left! No, your other left!" or "Use your plasma rifle!").

Figure 3B:
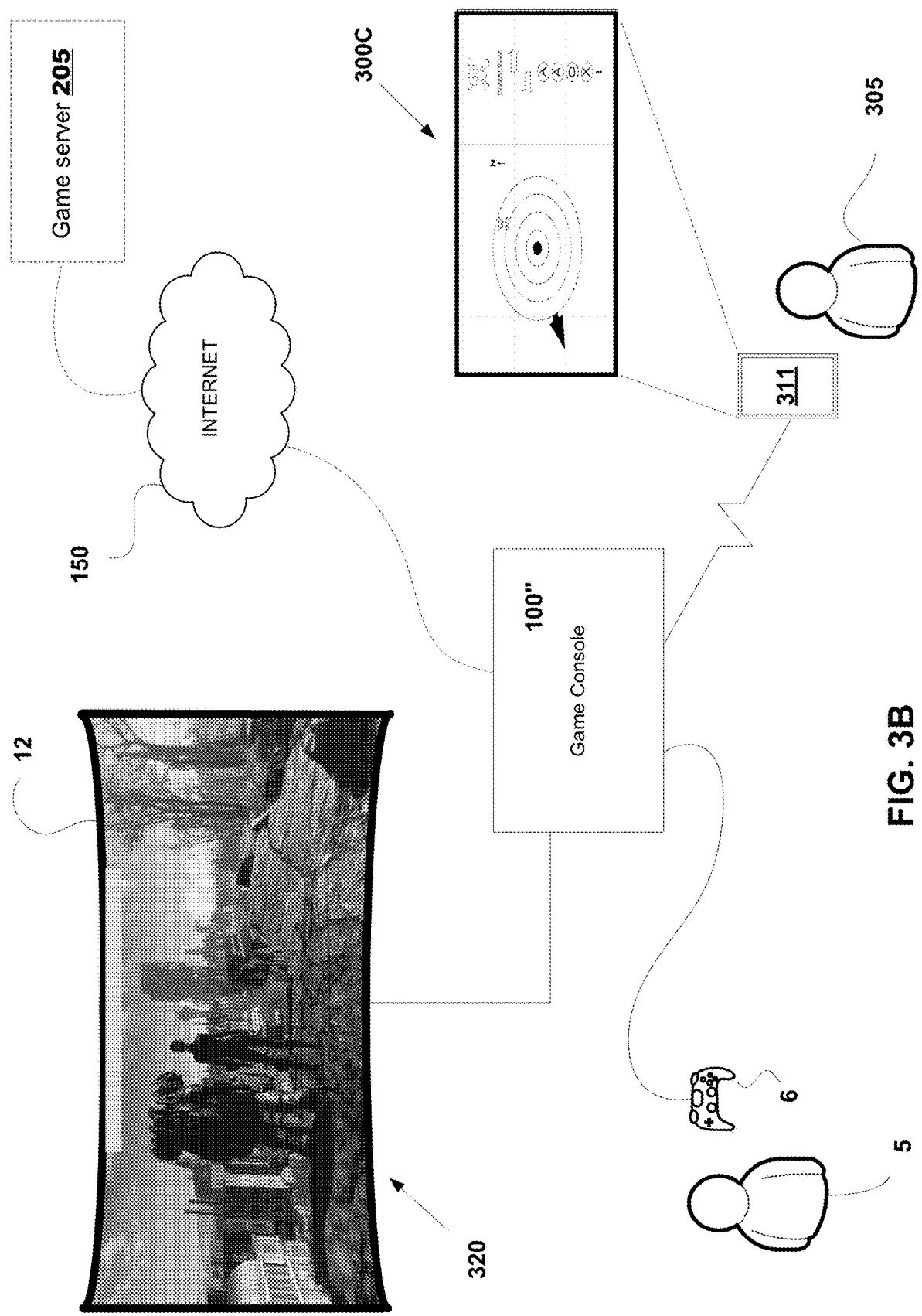
FIG. 3B illustrates the presentation of game play of a first user playing a gaming application on a display and the simultaneous presentation of a companion interface complementing the game play a device of a second user, in accordance with one embodiment of the present disclosure.

FIG. 3B illustrates the presentation of game play of a first user 5 playing a gaming application on a display 12 and the simultaneous presentation of a companion interface 300C complementing the game play on a device 311 of a second user 305, in accordance with one embodiment of the present disclosure. As previously described in FIG. 3A, the game play of user 5 is presented on display 12, which is viewable by the first user 5 and the second user 305 (as well as anyone within sight of display 12). In other implementations, game play of user 5 is presented on multiple displays, such as HMD 102 and display 12. In particular, rendered images generated by console 100" or streamed to console 100" (from back-end game server 205 over network 150) is delivered from console 100" to display 12 (e.g., through wired or wireless connection), wherein the rendered images show the game play of user 5 playing the gaming application.

In addition, exemplary companion interface 300C is presented on device 311 of second user 305. That is, the companion interface created by generator 113 and/or 213 includes contextually relevant information in association with the game play of user 5, and is streamed to device 311 concurrent with the game play of the user 5. For example, the contextually relevant information may include real-time assistance or help content that advances the game play of user 5, may provide for active participation (e.g., influence or control game play) in the game play of user 5 by the second user 305, and may enable the second user 305 to view the game play of user 5 (e.g., view into the gaming world of the gaming application as experienced by a character associated with user 5), wherein the second user 305 is able to able to control the view (active spectating) but not necessarily control the game play.

Figure 3C:
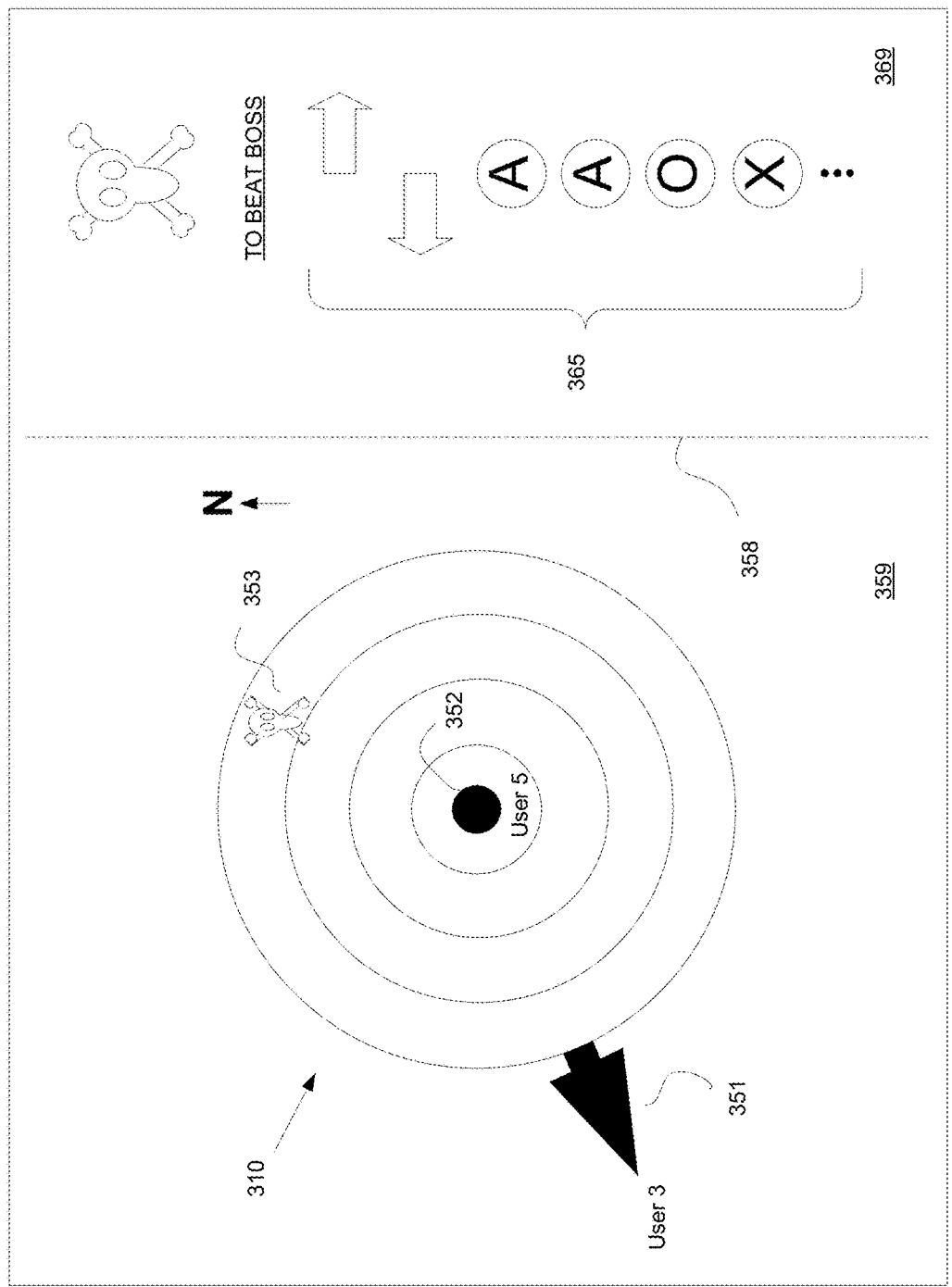
FIG. 3C is an illustration of an exemplary companion interface that is streamed to a device of a second user, wherein the companion interface complements game play of a first user playing a gaming application, in accordance with one embodiment of the present disclosure.

The exemplary companion interface 300C is more fully described in FIG. 3C, wherein the companion interface complements game play of a first user 5, wherein the companion interface 300C complements the game play of the first user 5, in accordance with one embodiment of the present disclosure. In particular, portion 359 to the left of line 358 of interface 300C includes a radar mapping 310 showing the location of a character associated with the game play of the first user 5 relative to locations of other objects in a gaming world of the gaming application, wherein the objects are generated in the game play. As shown, the character played by user 5 is located at center 352 of radar mapping 310, which includes, in part, directional, relative positioning, and relative distance information for one or more interesting features relevant to the character and the in-game location of the character (e.g., center 352 representing a location in the gaming world), such as location 353 of the boss, and a directional pointer 351 pointing to the character associated with the game play of another user 3. In one embodiment, the radar mapping 310 is generic and provides a quick reference of where the character associated with user 5 is in relation to other objects in the gaming world as provided through radar mapping, but need not have any direct reference to the gaming world (e.g., features or landmarks of the gaming world). That is, the radar mapping 2210A provides a plurality of directional relationships between the locations of the character of the user 5 at center 352 and one or more objects. The radar mapping can be scaled to any range (e.g., to include a small portion or a larger portion of the gaming world). In addition, radar mapping 310 includes a directional pointer 351 that points to the location of another player (e.g., user 3) within the gaming world or environment, or in a direction where the user should proceed, or where interesting game features may be found.

In addition, companion application interface 300C may provide assistance in how to complete a task, such as beating the boss 353. For example, an instruction feature may be generated and includes a list of commands implementable by user 5 to accomplish the objective of beating the boss 353. That is, a sequence of steps necessary to accomplish a task to be completed within the game play of the first user may be delivered from the first device to the second device, wherein the sequence of steps is provided within the companion interface. Further, the task may be determined based on location based information of the game play of the first user, wherein the location based information is made with reference to a location of a character in a gaming world associated with the gaming application, and wherein the information in the companion interface includes contextually relevant information for the location of the character. As shown in FIG. 3C, a sequence of steps, commands and/or instructions 365 (e.g., right button, left button, A button, etc.) is provided in section 369 to the right of line 58 of interface 300C. Because companion interface 300C is presented on device 311 of the second user 305, the second user is able to participate in the game play of user 5 by communicating the information in the companion interface 300C to user 5. For example, second user 305 may guide user 5 in his or her game play by announcing the step-by-step instructions provided in the instruction feature.

Figure 3D:
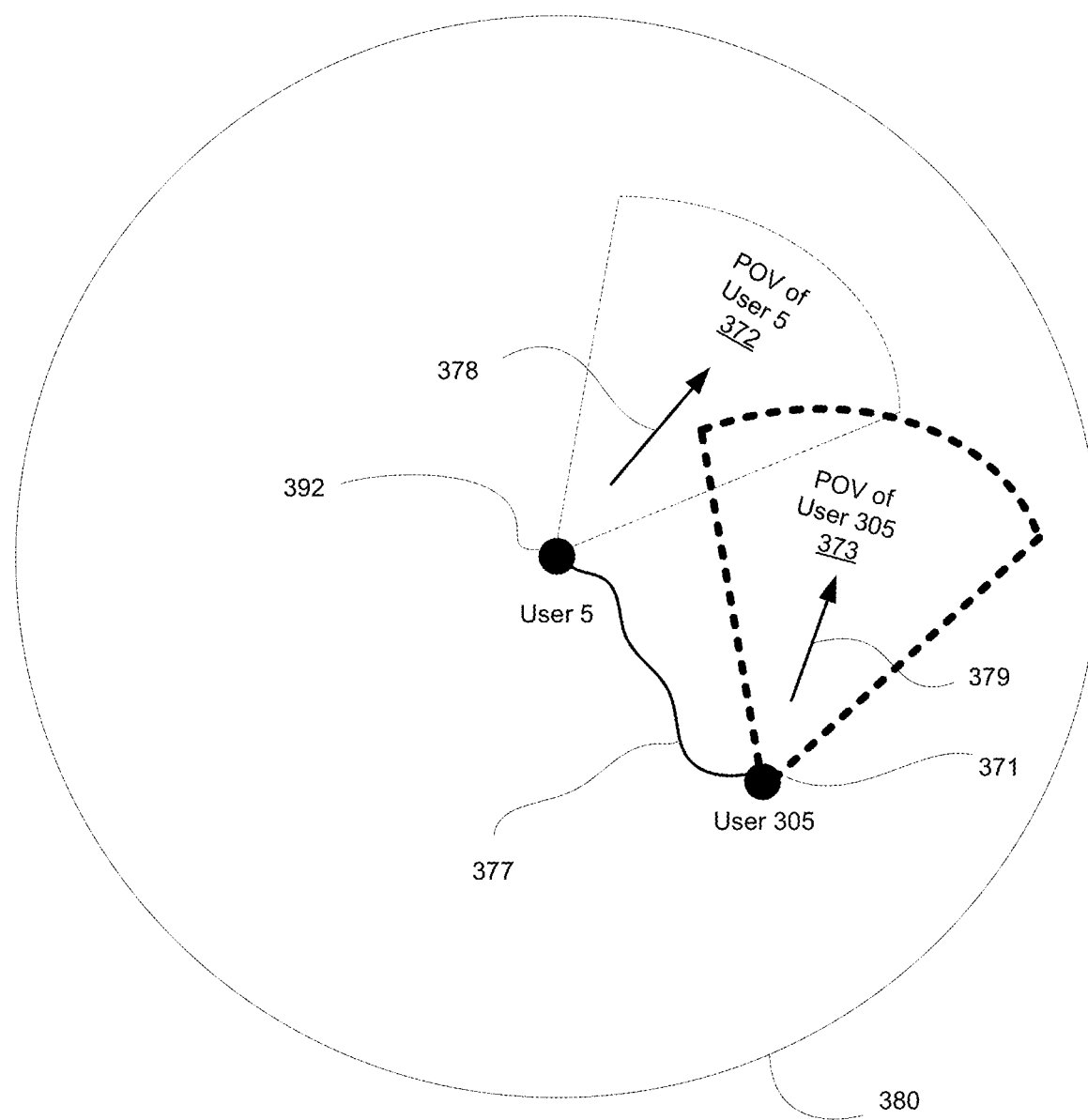
FIG. 3D is a diagram illustrating different points of view (POVs) of the user and a friend within a gaming world of the gaming application that is played by the user, wherein the POV of the friend is provided within a user interface (e.g., companion application), in accordance with one embodiment of the present disclosure.

FIG. 3D is a diagram illustrating different points of view (POVs) of the user 5 and friend 305 within a gaming world of the gaming application that is played by user 5, wherein the POV of friend 305 is provided within a user interface (e.g., companion application), in accordance with one embodiment of the present disclosure. As shown, the character associated with user 5 is at center 392 of the zone of interactivity 380. For illustration, center 392 may correspond to center 352 of the radar mapping 310 of FIG. 3B, such that the zone of interactivity 380 and the radar mapping 310 closely correspond to each other and are both centered at the location of the character. In that case, the zone of interactivity 380 may be contained within a representation of the radar mapping 310, or partly contained within the radar mapping 310.

The zone of interactivity 380 may define the possible area within the gaming world that the user 5 may interact with given a current progress of the gaming application, and is closely related to the location of the character associated with user 5 in the gaming world. Though the character of user 5 is not currently interacting with every portion of the zone 380 at a given point in time, the character is able to interact with every portion of zone 380. As an illustration, the character may rotate about center 392 and have a view into all areas of the zone of interactivity 380. Further, the zone of interactivity may include areas that may not be shown in any POV for location 392, but is available for interaction by the character (e.g., areas beyond the line-of-sight, areas around a cliff corner or building corner, areas beyond the horizon, etc.). For example, the zone of interactivity may define a level within which the character is located in one embodiment. In another embodiment, the zone of interactivity may be defined by the available processing power that is executing the gaming application. That is, a more powerful processor is able to populate a larger zone of interactivity 380 for the character of user 5 at any point in time in the game play, but a less powerful processor may only be able to populate a limited (e.g., smaller) zone of interactivity 380. In other embodiments, the zone of interactivity may be defined by the developer.

As introduced above, the point of view (POV) 372 corresponding to the character being played by user 5 is taken or viewed from center 392 of the zone of interactivity 380, and corresponds to a location in the gaming world. In addition, POV 372 has a direction 378 in the gaming world (e.g., northeast direction from center 392) at a current point in the game play. For example, when zone of interactivity 380 closely corresponds to radar mapping 310 of FIG. 3B, POV 372 may be in the direction of, and may even include an image of, the boss 353. In addition, POV 372 may be rotated within the zone of interactivity 380 as controlled by the direction in which the character of user 5 is looking into the gaming world.

The POV 373 corresponds to user 305 (e.g., friend) and is taken or viewed from point 371 within the zone of interactivity 380. Point 371 may be similarly located within radar mapping 310 (e.g., the same directional and distance relationship between centers 352/392 and point 371 exists in radar mapping 310 and zone of interactivity 380). For example, POV 373 may be presented to user 305 in the user interface (e.g., companion application) on a device associated with user 305. POV 373 has a direction 370 in the gaming world, wherein direction 370 may be different than direction 378 (corresponding to POV 372). As shown, user 305 has a view of the gaming world (through POV 373) that may be different than that associated with character of user 5 (e.g., POV 372). Further, POV 373 may be any direction within the zone of interactivity 380, and may be controlled by user 305.

Initially, POV 373 of user 305 may be identical to POV 372 of user 5, such that the view of the second user 305 is the same as the view of the first user 5, both providing the same view into the gaming world from the same location. In that case, point 371 would be closely aligned with center 392 corresponding to the character location associated with the game play of user 5. Furthermore, in embodiments of the present invention, POV 373 may be different than POV 372 and is controllable by user 305. For example, when point 371 is at center 392, POV 373 may rotate about center 392 so that it is different than POV 372. The POV 373 includes information that is contained within the zone 380, such that POV 373 will not include information relating to areas outside of zone 380, as defined by the location of the character of user 5 at center 392.

In addition, point 371 may be different than center 392. For purposes of illustration only, a tether 377 ties center 392 (point from which POV 372 is taken) to point 371 (point from which POV 373 is taken). The tether 377 has a maximum length, which signifies a maximum distance that point 371 may be separated from center 392. As such, user 305 may move point 371 to any location within the zone of interactivity 380 as long as the maximum length of tether 377 has not been exceeded. Further, user 305 may rotate about point 371 to change the direction of POV 373. In that manner, user 305 is able to scout out areas within the zone of interactivity that is unknown and not viewable to user 5 through POV 372. For example, user 305 is able to scout ahead to see if there is any imminent danger without influencing the game play of user 5 (e.g., scouting ahead and discovering a mini-boss without incurring any damage to the character of user 5 located at center 392). In this manner, user 305 is able to provide assistance to user 5 by discovering what tasks, objects, enemies, etc. are presented in the zone of interactivity 380. For example, user 305 has a greater view of the gaming world and can provide verbal instructions to user 5, such as "Turn here."; "Turn right, just past that tree."; "Pick this up on the other side of the tree."; "Use the plasma rifle to defeat the target up ahead."; "Pick up the ammo on your left! No the other left!;" etc. As described, user 305 is a spectator into the game play of user 5 through POV 373, which can be taken from various points in the zone of interactivity 380, as previously described (e.g., from center 392 out to a maximum distance of tether 377 in any direction), in one embodiment.

In one embodiment, when tether 377 has been extended to its maximum length, POV 373 automatically resets back to POV 372. In another embodiment, when tether 377 reaches its maximum length, point 371 is constrained such that it cannot be further extended, but can be retracted or moves in an arc as constrained by tether 377.

In another embodiment, user 305 is able to actively control and/or participate in the game play of user 5. That is, user 305 is able to influence or control the game play. For example, user 305 is able to play another character in the game play. For illustration, user 305 is able to control an artificial intelligence (AI) character that is generated by the execution of the gaming application in the game play of user 5. Typically, the AI character is controlled by the gaming application, but in embodiments, user 305 is able to control the movement and actions of the AI character within the game play of user 5 through the interface. In that manner, user 305 may be able to help user 5 accomplish a task more quickly (e.g., gather a defined set of objects, eliminate a group of soldiers, capture a flag or area, etc.). In the active participation scenario, user 305 may select (or be assigned) an AI character to control. In that case, POV 373 takes on the viewpoint into the gaming world of the AI character and its location, and will necessarily be different than POV 372 of user 5, especially because they are taken from different locations in the gaming world. User 305 may control the AI character and move throughout the zone of interactivity 380, again up to the maximum length of tether 377. The POV 373 is contained within the zone 380, such that POV 373 will not include information relating to areas outside of zone 380, as defined by the location of the character of user 5.

Figure 4A:
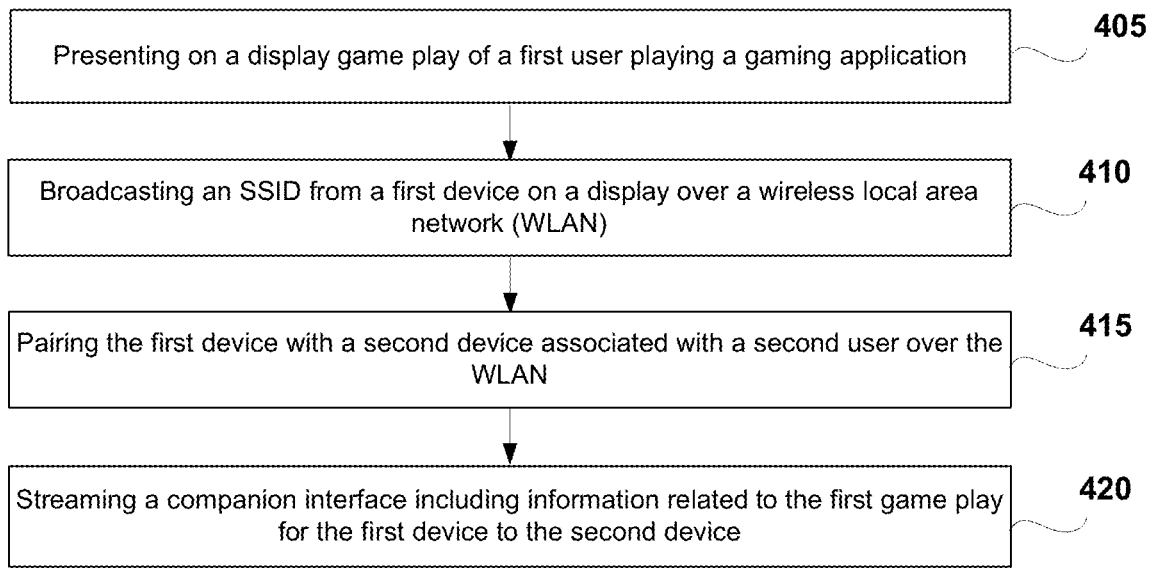
FIG. 4A is a flow diagram illustrating steps in a method for providing information presented through a companion interface complementing game play of a first user playing a gaming application, wherein the companion interface is streamed over a wireless network to the device of the second user without requiring application install, in accordance with one embodiment of the present disclosure.

With the detailed description of the various modules of the gaming server and client device communicating over a network, flow diagram 400A of FIG. 4A discloses a method for providing information complementing game play of a first user playing a gaming application to a device of a second user over a wireless network, wherein the device of the second user is paired to a gaming console broadcasting a network identifier in order to stream a user interface to the device of the second user without requiring application install, in accordance with one embodiment of the present disclosure. In some embodiments, the complementing information is provided within a companion interface that is configured to complement game play of a user playing a gaming application, wherein the companion interface is generated by the companion application generator 213 or 113 of FIGS. 1A-1C and 2. Flow diagram 400A is implemented within a client device, previously described. In one implementation, the client device is a gaming console (also referred to as game console. For purposes of clarity and illustration, flow diagram 400A is described in part with the use of gaming console, but is understood to be generically applicable to any type of client device.

At 405, the method includes presenting on a display game play of a first user playing a gaming application. The gaming application may be executing locally at a gaming console (e.g., client device), previously described. In this case, the gaming console is configured to generate rendered images representative of the game play, and deliver the rendered images to one or more displays. In another embodiment, the gaming application may be executing remote from the first user at a back end game server (e.g., game executing engine 211 of game server 205). In this case, the back end game server is configured to generate rendered images representative of the game play, and stream/deliver the rendered images to the gaming console associated with the first user. The gaming console then delivers the rendered images to one or more displays.

In one implementation, the rendered images are presented on a main display that is viewable by the first user and other users (e.g., friends of the first user) that are present. In another implementation, the rendered images are presented on a display that is viewable by any user that is present, and within an HMD viewable by the first user. In either implementation, one or more users are able to view and participate in the game play, in various embodiments of the present invention.

At 410, the method includes broadcasting a network identifier from the gaming console (e.g., a first device) over a wireless local area network (WLAN). For example, in one embodiment, the network identifier is a service set identifier (SSID) that is associated with the Institute of Electrical and Electronics Engineers (IEEE) 802.11 communications standard and its derivatives used for implementing a WLAN. For example, the WLAN may implement a Wi-Fi network. More particularly, the WLAN links two or more devices within a limited area (e.g., room, multiple rooms, office, etc.) so that communication may be established between the devices.

At 415, the method includes pairing the first device (e.g., gaming console) and a second device associated with a second user over the WLAN. For example, the second device may be a mobile device (e.g., phone, tablet, etc.) that is associated with and/or owned by the second user. In particular, the gaming console broadcasts the network identifier so that any device receiving the broadcast (i.e., recognizing the SSID that is associated with the WLAN) can initiate a new network connection over the WLAN. In this case, the second device associated with the second user is able to scan for available networks, and pick up through the scan the network identifier (e.g., SSID) that is associated with and broadcast by the gaming console. In one embodiment, the WLAN is a Wi-Fi network operating under any number of available configurations (e.g., network operating using an access point mode, network operating in an ad-hoc mode for direct communication between devices, etc.). Any available wireless network may be used in other embodiments (e.g., Bluetooth, etc.). As such, upon selection (e.g., by the second user) of the network identifier via the second device, the network connection is initiated at least between the gaming console and the second device.

At 420, the method includes streaming information (e.g., a companion interface including the information) related to the first game play from the first device to the second device. For example, a companion interface including the information may be streamed to the second device, wherein the companion interface is configured to complement game play of the first user. More particularly, the information is streamed concurrent with the game play of the first user. As a result, by pairing to the gaming console to the second device via the special Wi-Fi SSID that the console generates, the second device can immediately and automatically open a webview containing a UI (e.g., the companion interface, or any other UI) that is streamed directly to the second device. That is, the second device need not install a dedicated and/or proprietary application to open and view the companion interface. Instead, because the companion interface is formatted using the hypertext transfer protocol (HTTP), or any other browser supported formatting or protocol, the second device can open the companion interface using a browser (e.g., open the webview).

As such, the second user is instantly connected to the gaming console in order to receive and/or display a rich native-feeling companion interface, without needing to download or install anything (e.g., application). The mere selection on the second device of the network identifier, initiates a connection between the two devices over the wireless network. Immediately after connecting, a webview is displayed showing the companion interface. That is, the act of connecting to the particular network (i.e., identified by the network identifier) is what spawns the webview as displayed on the second device, without any additional interactive or interactions by the second user or second device. For example, a webpage including the companion interface is loaded onto the webview. In that manner, the second user is able to easily and frictionlessly connect his or her own mobile device to the gaming console in such a way in order to receive the information, such as in the form of a companion interface, instead of using a device belonging to and/or controlled by the first user.

Various configurations are supported in the generation and delivery of the game play and the companion interface. That is, any combination and/or configuration of a local gaming console and a back-end game server can be implemented for execution of the gaming application associated with the game play and the generation of the companion interface, as well as the delivery of such to one or more displays. Several implementations or use cases are described below, but are not meant to be exhaustive.

In one implementation, the gaming console operates as a stand-alone system without any back-end server support, wherein an instance of the gaming application is instantiated at the gaming console and executing in association with the game play of the first user at the gaming console. In addition, the companion interface is generated at and/or by the gaming console, wherein the information in the companion interface is generated based on location based information of the game play of the first user. For example, the location based information is made with reference to a location of a character in a gaming world associated with the gaming application, and wherein the information includes contextually relevant information for the location of the character.

In another implementation, the gaming console operates in conjunction with back-end server support. For example, in one use case, an instance of the gaming application is instantiated at the gaming console and executing in association with the game play of the first user at the gaming console. The gaming console delivers rendered images in association with the game play of the first user to one or more displays. In addition, the companion interface is generated by the back-end game server, wherein the information in the companion interface is generated based on location based information of the game play of the first user. For example, the location based information is made with reference to a location of a character in a gaming world associated with the gaming application, and wherein the information includes contextually relevant information for the location of the character. The companion interface may be delivered from the game server to the gaming console, wherein the gaming console streams/delivers the companion interface via the WLAN to the second device of the second user.

In still another implementation, the gaming console operates as a facilitator with back-end server support. For example, in a use case, an instance of the gaming application is instantiated at the back-end game server and executing in association with the game play of the first user at the gaming console. The gaming console acts as a thin client, as previously described, and provides an interface between the first user and the back-end game server. As such, the back-end game server delivers rendered images in association with the game play of the first user to the client device, and the client device delivers the rendered images to one or more displays. That is, the first device receives streamed data representative of the game play of the first user from the instance of the gaming application executing at the back-end game server in association with the game play of the first user. In addition, the companion interface is generated by the back-end game server, wherein the information in the companion interface is generated based on location based information of the game play of the first user. For example, the location based information is made with reference to a location of a character in a gaming world associated with the gaming application, and wherein the information includes contextually relevant information for the location of the character. The companion interface may be delivered from the game server to the gaming console, wherein the gaming console streams/delivers the companion interface via the WLAN to the second device of the second user. That is, the first device receives the companion interface from the back-end game server, wherein the information in the companion interface is generated based on location based information of the game play of the user, wherein the location based information is made with reference to a location of a character in a gaming world associated with the gaming application, and wherein the information includes contextually relevant information for the location of the character.

In still another embodiment, the companion interface is streamed directly to the second device of the second user via a communication network (e.g., the internet). That is, the companion interface is generated at the back-end game server, wherein the companion interface complements game play of the first user playing a gaming application. Execution of the gaming application in this use case may be at a local game execution engine (e.g., located on the game console), or may be remote from the first user at a back-end game server.

In one embodiment, when the second user leaves the area or disconnects from the connection over the WLAN (e.g., Wi-Fi network), then the webview including the companion interface automatically closes. As such, the companion interface disappears from the second device of the second user. No process for uninstalling is required. In addition, no residual data remains on the second device, in one embodiment. That is, the separation is clean.

In still another embodiment, the gaming console (i.e., first device) likely knows of the second device from the initial connection previously described. That is, the act of connecting the second device to the first device using the network identifier (e.g., SSID), previously described, could instantly identify the second device to the gaming console, and vice-versa. As such, the next time the second device becomes aware of the WLAN and the gaming console, such as by scanning the area and discovering the SSID, a connection can automatically be established between the two devices. For example, the next time the second user returns to the house of the first user, the second device of the second user would automatically connect to the gaming console over the Wi-Fi network. A streamed UI (e.g., companion interface as a webview) opens automatically. A message may be presented within the webview—saying "Welcome back, Second User." The process of reconnecting would be completely frictionless, and requires no user input. That is, the second user would not even have to touch the second device (e.g., to provide inputs). In addition, this process is performed without any installation of instructions, applications, etc.

In another embodiment, the process of connecting a device to the gaming console outlined in flow diagram 400A can be applied to multiple devices of multiple users. For example, the process could also be used to allow a group of persons in a room to establish a connection to the first device (e.g., gaming console) using their respective mobile phones, such as to log into the gaming console. In a use case of a group of friends (e.g., first user playing the gaming application, a second user, a third user, etc.), each of the friends other than the first user may log into the gaming console in order to receive information complementing the game play of the first user, such that everyone is able to participate in the game play. For example, each friend (i.e., other than the first user) could simultaneously connect to this gaming console SSID with their own respective mobile devices (e.g., phones, etc.). Anyone who connects to the SSID could be presented with the login screen on their phones, and they could log in more privately, securely, and conveniently using their own phone's on-screen keyboard. The information and/or companion interfaces including the information may be the same as delivered to each of the users (e.g., second user, third user, etc.) other than the first user, or may have different information and/or companion interfaces containing the different information delivered to the various users. The connections and processes for logging into the gaming console would be performed frictionlessly without application install, instead of the typical method of passing the gaming controller around the room as each friend laboriously types in their login information to establish connections between the various devices while everyone watches.

In another embodiment, a secure connection is established between the second device of the second user and the gaming console, and also between each of the devices connecting the gaming consoles. Projecting this further, in the example of a group of friends gathering at a home, wherein the first user is playing a gaming application in a game play, and the remaining friends are participating in the game play through respective companion interfaces on respective mobile devices that are simultaneously connected to the gaming console via the broadcast SSID, each of these various connections can also be secure.

In one implementation, because each of the users are establishing connections using their own devices, this provides for geographic security (i.e., only devices within an area can connect), and for preventing or limiting access to some of the devices of the first user. For example, anyone who connects to the SSID could be presented with a private login screen on their corresponding phones.

In another implementation, the secure process involves some interaction with and by the second user, so that the second user is aware of the connection to the gaming console of one of his or her devices. Using the example where the second user is called Warren, since the second device knows who its owner is (i.e., Warren), just the act of the second device connecting to the SSID (i.e., selection of the SSID that is broadcast by the gaming console) could tell the gaming console who the second user is, and provide a further instruction, such as "Warren is here. Log him in." To add a security measure, the instruction to the gaming console may indicate that "Warren is here. Stream a login button to his device." The friend (e.g., Warren as the second user) then gets a streamed UI with a login button that can require some user interaction to establish a connection (e.g., a single tap on the login button). In this manner, adding this extra step ensures that the second device is not logged in automatically without the knowledge and/or consent of the second user— Warren.

In another embodiment, another secure process is used for logging into the gaming console. This process limits the connections with the gaming console to those users who are made aware of a passcode (e.g., through audio, visible, digital, or any other form of communication). In that manner, others that are within the scanning region of the broadcast SSID associated with the WLAN (e.g., walking by the apartment building on a downtown street) cannot establish a connection without permission by the first user, such as through some controlled passcode. The process includes generating a passcode of any format (e.g., audio, digital, text, etc.). The passcode is delivered to the display, which is viewable or within hearing distance by the second user. Because the display may be located in a room with walls preventing persons outside of the room from viewing the display, these other persons would be unaware of the passcode. At the same time, the device of the second user may have a login screen as a webview requesting the passcode as authentication. The passcode may be received at the gaming console as delivered by the second device, wherein successful delivery is required for successful pairing between the second device and the gaming console (i.e., the first device).

Figure 4B:
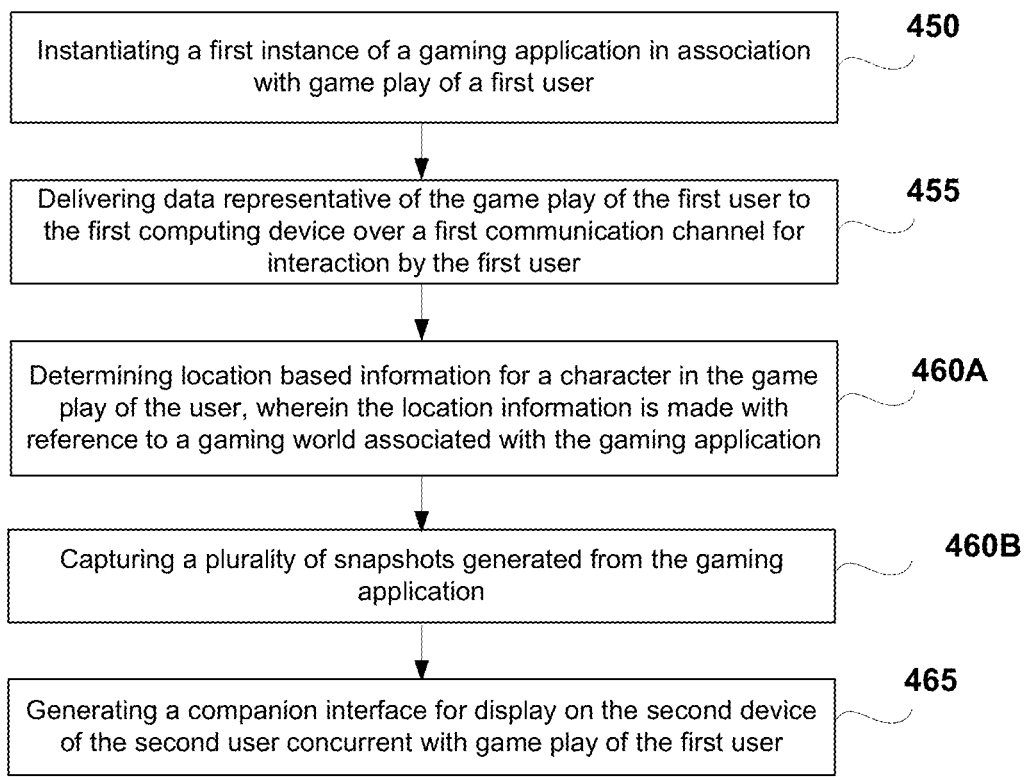
FIG. 4B is a flow diagram illustrating steps in a method for generating a location based companion interface of a companion application complementing game play of a first user, wherein the companion interface is streamed to a device of a second user over a wireless network without requiring application install, in accordance with one embodiment of the present disclosure.

FIG. 4B is a flow diagram 400B illustrating steps in a method for generating a location based companion interface of a companion application (e.g., generating a companion interface) complementing game play of a first user, wherein the companion interface is streamed to a device of a second user over a wireless network, as outlined in flow diagram 400A, in accordance with one embodiment of the present disclosure. For example, the device of the second user is paired to a gaming console broadcasting a network identifier in order to stream the companion interface to the device of the second user without requiring application install. Flow diagram 400B includes operations for executing a gaming application and generating location based information of game play of a user playing the gaming application. Further, though flow diagram 400B is described from the standpoint of a back-end server providing the companion interface as complementing content, other embodiments are well suited to providing the companion interface local to the user, as previously described, with slight modifications to flow diagram 400B.

In particular, at operation 450 the method includes instantiating a first instance of a gaming application in association with game play of a first user. As previously described, in one embodiment, the instance of the gaming application can be executed locally at a client device of the first user. In other embodiments, the instance of the gaming application may be executing at a back-end game executing engine of a back-end game server, wherein the server may be part of a cloud game network or game cloud system. At operation 355, the method includes delivering data representative of the game play of the first user to a computing device (e.g., gaming console) over a first communication channel for interaction by the user (e.g., first user). The communication channel may be implemented for example through a network, such as the internet. As such, rendered images may be delivered for presentation at a display associated with the gaming console, wherein the rendered images are generated by the instance of the gaming application in response to input commands made in association with game play of the first user.

At operation 460A, the method includes determining location based information for a character in the game play of the first user. In particular, the location based information is made with reference to a location of a character in the game play of the first user in a gaming world associated with the gaming application. The location based information may be included within snapshots that are generated, captured and/or stored during the game play of the first user, as previously described. For example, each snapshot includes metadata and/or information generated with reference to the location of the character. In one embodiment, the metadata and/or information is configured to enable execution of an instance of the gaming application beginning at a point in the gaming application corresponding to the snapshot (e.g., beginning at a jump point corresponding to the state of the game play when the snapshot was captured, which reflects the location of the character in the game play). In one embodiment, a snapshot may be used to instantiate a jump game that is a quest/challenge. For instance, the snapshot includes location based information of the game play, and game state data that defines the state of the game play at the corresponding point (e.g., game state data includes game characters, game objects, object attributes, graphic overlays, assets of a character, skill set of the character, history of task accomplishments within the gaming application for the character, current geographic location of the character in the gaming world, progress through the gaming application in the game play of the user, current status of the game play of the character, etc.), such that the game state data allows for generation of the gaming environment that existed at the corresponding point in the game play. The snapshot may include user saved data used to personalize the gaming application for the first user, wherein the data may include information to personalize the character (e.g., shape, look, clothing, weaponry, game difficulty, game level, character attributes, etc.) in the game play. The snapshot may also include random seed data that is relevant to the game state, as previously described.

In particular, at operation 460B the method includes capturing a plurality of snapshots generated from the gaming application during the game play of the first user. The information contained within the snapshots may be used for the generation of information complementing the game play of the first user (e.g., contained within a companion interface). As such, additional content related to the gaming application, and in some cases relying on execution of the gaming application, may be newly generated. This increases the amount of content and the scope of content related to a gaming application for interaction by one or more users.

At 465, the method includes generating a companion interface providing features in support of the game play of the first user (e.g., including contextually relevant information), and enables the first user, or any other viewer (e.g., second user, third user, etc.), to access information in real time that is generally helpful to first user while playing the gaming application. In particular, the companion interface is presented or provides information complementing the game play of the first user, and is generated in real time, and delivered concurrent with the game play of the first user, such that the information provided through the interface complements the game play of the first user. In particular, a companion interface including the information (e.g., contextually relevant content) may be streamed to a device of a second user over a wireless network, wherein the device of the second user is paired to a gaming console (i.e., the first device) broadcasting a device identifier in order to stream the companion interface to the device of the second user without requiring application install. In that manner, the second user is able to participate in the game play of the first user playing the gaming application.

While specific embodiments have been provided to demonstrate the providing of information complementing game play of a first user playing the gaming application to a device of a second user over a wireless network, wherein the information may be provided within a user interface (e.g., companion interface) that is streamed to the device of the second user without requiring application install, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the embodiments described herein may be executed on any type of client device. In some embodiments, the client device is a head mounted display (HMD).

Figure 5:
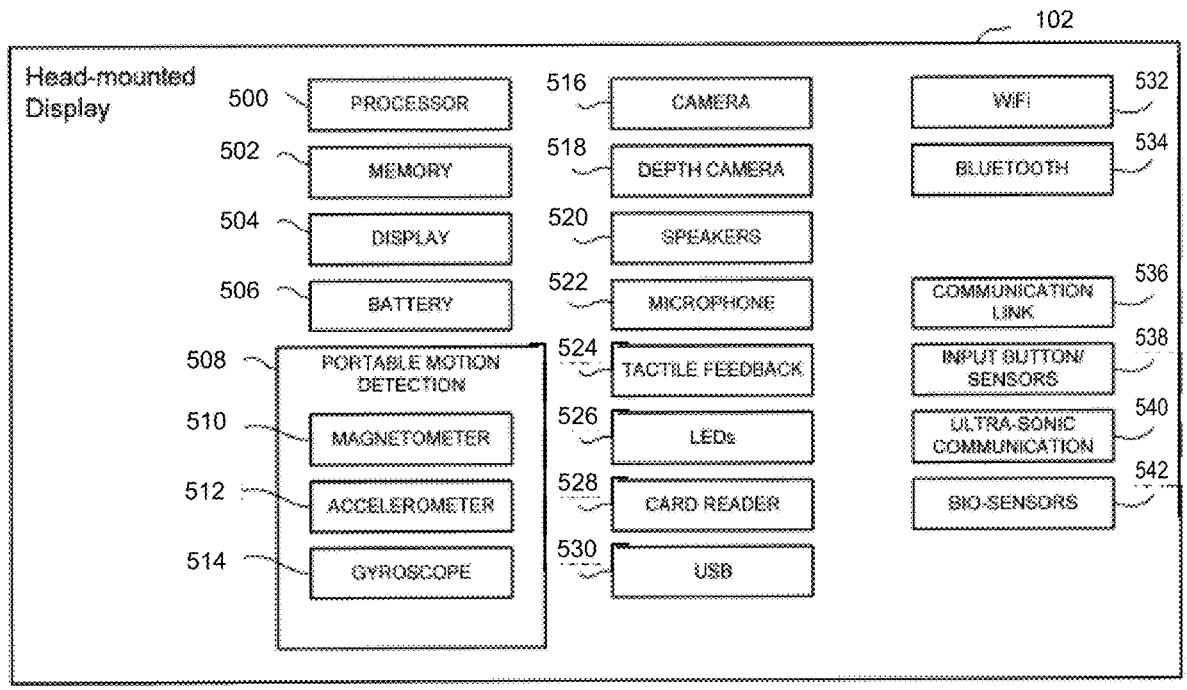
FIG. 5 is a diagram illustrating components of a head-mounted display, in accordance with an embodiment of the disclosure.

FIG. 5, a diagram illustrating components of a head-mounted display 102 is shown, in accordance with an embodiment of the disclosure. The head-mounted display 102 includes a processor 500 for executing program instructions. A memory 502 is provided for storage purposes, and may include both volatile and non-volatile memory. A display 504 is included which provides a visual interface that a user may view. A battery 506 is provided as a power source for the head-mounted display 102. A motion detection module 508 may include any of various kinds of motion sensitive hardware, such as a magnetometer 510A, an accelerometer 512, and a gyroscope 514.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 512 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 510A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 512 is used together with magnetometer 510A to obtain the inclination and azimuth of the head-mounted display 102.

A gyroscope is a device for measuring or maintaining orientation, based on the principles of angular momentum. In one embodiment, three gyroscopes 514 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 516 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 518 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 520 for providing audio output. Also, a microphone 522 may be included for capturing audio from the real environment, including sounds from the ambient environment, speech made by the user, etc. The head-mounted display 102 includes tactile feedback module 524 for providing tactile feedback to the user. In one embodiment, the tactile feedback module 524 is capable of causing movement and/or vibration of the head-mounted display 102 so as to provide tactile feedback to the user.

LEDs 526 are provided as visual indicators of statuses of the head-mounted display 102. For example, an LED may indicate battery level, power on, etc. A card reader 528 is provided to enable the head-mounted display 102 to read and write information to and from a memory card. A USB interface 530 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 532 is included for enabling connection to the Internet via wireless networking technologies. Also, the head-mounted display 102 includes a Bluetooth module 534 for enabling wireless connection to other devices. A communications link 536 may also be included for connection to other devices. In one embodiment, the communications link 536 utilizes infrared transmission for wireless communication. In other embodiments, the communications link 536 may utilize any of various wireless or wired transmission protocols for communication with other devices.

Input buttons/sensors 538 are included to provide an input interface for the user. Any of various kinds of input interfaces may be included, such as buttons, touchpad, joystick, trackball, etc. An ultra-sonic communication module 540 may be included in head-mounted display 102 for facilitating communication with other devices via ultra-sonic technologies.

Bio-sensors 542 are included to enable detection of physiological data from a user. In one embodiment, the bio-sensors 542 include one or more dry electrodes for detecting bio-electric signals of the user through the user's skin.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 6:
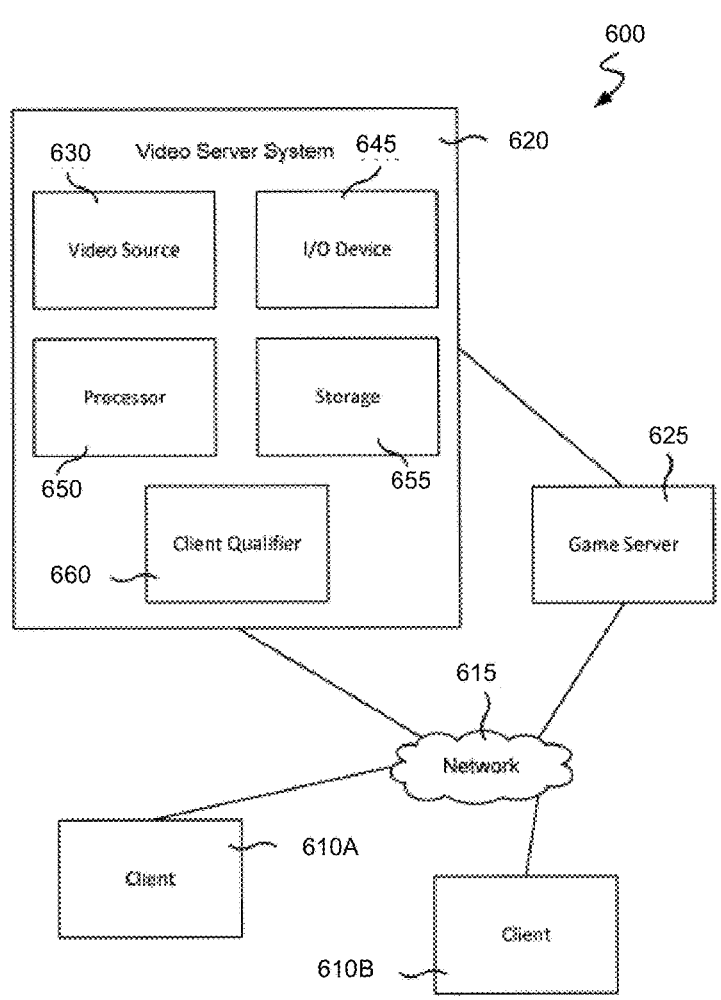
FIG. 6 is a block diagram of a Game System, according to various embodiments of the disclosure.

FIG. 6 is a block diagram of a Game System 600, according to various embodiments of the disclosure. Game System 600 is configured to provide a video stream to one or more Clients 610 via a Network 615. Game System 600 typically includes a Video Server System 620 and an optional game server 625. Video Server System 620 is configured to provide the video stream to the one or more Clients 610 with a minimal quality of service. For example, Video Server System 620 may receive a game command that changes the state of or a point of view within a video game, and provide Clients 610 with an updated video stream reflecting this change in state with minimal lag time. The Video Server System 620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 820 frames per second. Although higher or lower frame rates are included in alternative embodiments of the disclosure.

Clients 610, referred to herein individually as 610A, 610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 610 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 610 or on a separate device such as a monitor or television. Clients 610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 610 are optionally geographically dispersed. The number of clients included in Game System 600 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 620 to deliver a game viewed through the HMD. In one embodiment, the game console receives the video stream from the video server system 620, and the game console forwards the video stream, or updates to the video stream, to the HMD for rendering.

Clients 610 are configured to receive video streams via Network 615. Network 615 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 610 may, but are not required to, further include systems configured for modifying received video. For example, a client may be configured to perform further rendering, to overlay one video image on another video image, to crop a video image, and/or the like. For example, Clients 610 may be configured to receive various types of video frames, such as I-frames, P-frames and B-frames, and to process these frames into images for display to a user. In some embodiments, a member of Clients 610 is configured to perform further rendering, shading, conversion to 3-D, or like operations on the video stream. A member of Clients 610 is optionally configured to receive more than one audio or video stream. Input devices of Clients 610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 610 is generated and provided by Video Server System 620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 610 are typically configured to receive inputs from a user. These inputs may include game commands configured to change the state of the video game or otherwise affect gameplay. The game commands can be received using input devices and/or may be automatically generated by computing instructions executing on Clients 610. The received game commands are communicated from Clients 610 via Network 615 to Video Server System 620 and/or Game Server 625. For example, in some embodiments, the game commands are communicated to Game Server 625 via Video Server System 620. In some embodiments, separate copies of the game commands are communicated from Clients 610 to Game Server 625 and Video Server System 620. The communication of game commands is optionally dependent on the identity of the command Game commands are optionally communicated from Client 610A through a different route or communication channel that that used to provide audio or video streams to Client 610A.

Game Server 625 is optionally operated by a different entity than Video Server System 620. For example, Game Server 625 may be operated by the publisher of a multi-player game. In this example, Video Server System 620 is optionally viewed as a client by Game Server 625 and optionally configured to appear from the point of view of Game Server 625 to be a prior art client executing a prior art game engine. Communication between Video Server System 620 and Game Server 625 optionally occurs via Network 615. As such, Game Server 625 can be a prior art multiplayer game server that sends game state information to multiple clients, one of which is game server system 620. Video Server System 620 may be configured to communicate with multiple instances of Game Server 625 at the same time. For example, Video Server System 620 can be configured to provide a plurality of different video games to different users. Each of these different video games may be supported by a different Game Server 625 and/or published by different entities. In some embodiments, several geographically distributed instances of Video Server System 620 are configured to provide game video to a plurality of different users. Each of these instances of Video Server System 620 may be in communication with the same instance of Game Server 625. Communication between Video Server System 620 and one or more Game Server 625 optionally occurs via a dedicated communication channel. For example, Video Server System 620 may be connected to Game Server 625 via a high bandwidth channel that is dedicated to communication between these two systems.

Video Server System 620 comprises at least a Video Source 630, an I/O Device 645, a Processor 650, and non-transitory Storage 655. Video Server System 620 may include one computing device or be distributed among a plurality of computing devices. These computing devices are optionally connected via a communications system such as a local area network.

Video Source 630 is configured to provide a video stream, e.g., streaming video or a series of video frames that form a moving picture. In some embodiments, Video Source 630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 625. Game Server 625 may maintain a copy of the state of the game based on game commands received from multiple players using geographically disperse clients. In these cases, the game state is provided by Game Server 625 to Video Source 630, wherein a copy of the game state is stored and rendering is performed. Game Server 625 may receive game commands directly from Clients 610 via Network 615, and/or may receive game commands via Video Server System 620.

Video Source 630 typically includes rendering logic, e.g., hardware, firmware, and/or software stored on a computer readable medium such as Storage 655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 610. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 630 includes a video recording device such as a camera. This camera may be used to generate delayed or live video that can be included in the video stream of a computer game. The resulting video stream optionally includes both rendered images and images recorded using a still or video camera. Video Source 630 may also include storage devices configured to store previously recorded video to be included in a video stream. Video Source 630 may also include motion or positioning sensing devices configured to detect motion or position of an object, e.g., person, and logic configured to determine a game state or produce video-based on the detected motion and/or position.

Video Source 630 is optionally configured to provide overlays configured to be placed on other video. For example, these overlays may include a command interface, log in instructions, messages to a game player, images of other game players, video feeds of other game players (e.g., webcam video). In embodiments of Client 610A including a touch screen interface or a gaze detection interface, the overlay may include a virtual keyboard, joystick, touch pad, and/or the like. In one example of an overlay a player's voice is overlaid on an audio stream. Video Source 630 optionally further includes one or more audio sources.

In embodiments wherein Video Server System 620 is configured to maintain the game state based on input from more than one player, each player may have a different point of view. Video comprising a position and direction of view. Video Source 630 is optionally configured to provide a separate video stream for each player based on their point of view. Further, Video Source 630 may be configured to provide a different frame size, frame data size, and/or encoding to each of Client 610. Video Source 630 is optionally configured to provide 3-D video.

I/O Device 645 is configured for Video Server System 620 to send and/or receive information such as video, commands, requests for information, a game state, gaze information, device motion, device location, user motion, client identities, player identities, game commands, security information, audio, and/or the like. I/O Device 645 typically includes communication hardware such as a network card or modem. I/O Device 645 is configured to communicate with Game Server 625, Network 615, and/or Clients 610.

Processor 650 is configured to execute logic, e.g. software, included within the various components of Video Server System 620 discussed herein. For example, Processor 650 may be programmed with software instructions in order to perform the functions of Video Source 630, Game Server 625, and/or a Client Qualifier 660. Video Server System 620 optionally includes more than one instance of Processor 650. Processor 650 may also be programmed with software instructions in order to execute commands received by Video Server System 620, or to coordinate the operation of the various elements of Game System 600 discussed herein. Processor 650 may include one or more hardware device. Processor 650 is an electronic processor.

Storage 655 includes non-transitory analog and/or digital storage devices. For example, Storage 655 may include an analog storage device configured to store video frames. Storage 655 may include a computer readable digital storage, e.g., a hard drive, an optical drive, or solid state storage. Storage 655 is configured (e.g., by way of an appropriate data structure or file system) to store video frames, artificial frames, a video stream including both video frames and artificial frames, audio frame, an audio stream, and/or the like. Storage 655 is optionally distributed among a plurality of devices. In some embodiments, Storage 655 is configured to store the software components of Video Source 630 discussed elsewhere herein. These components may be stored in a format ready to be provisioned when needed.

Video Server System 620 optionally further comprises Client Qualifier 660. Client Qualifier 660 is configured for remotely determining the capabilities of a client, such as Clients 610A or 610B. These capabilities can include both the capabilities of Client 610A itself as well as the capabilities of one or more communication channels between Client 610A and Video Server System 620. For example, Client Qualifier 660 may be configured to test a communication channel through Network 615.

Client Qualifier 660 can determine (e.g., discover) the capabilities of Client 610A manually or automatically. Manual determination includes communicating with a user of Client 610A and asking the user to provide capabilities. For example, in some embodiments, Client Qualifier 660 is configured to display images, text, and/or the like within a browser of Client 610A. In one embodiment, Client 610A is an HMD that includes a browser. In another embodiment, client 610A is a game console having a browser, which may be displayed on the HMD. The displayed objects request that the user enter information such as operating system, processor, video decoder type, type of network connection, display resolution, etc., of Client 610A. The information entered by the user is communicated back to Client Qualifier 660.

Automatic determination may occur, for example, by execution of an agent on Client 610A and/or by sending test video to Client 610A. The agent may comprise computing instructions, such as java script, embedded in a web page or installed as an add-on. The agent is optionally provided by Client Qualifier 660. In various embodiments, the agent can find out processing power of Client 610A, decoding and display capabilities of Client 610A, lag time reliability and bandwidth of communication channels between Client 610A and Video Server System 620, a display type of Client 610A, firewalls present on Client 610A, hardware of Client 610A, software executing on Client 610A, registry entries within Client 610A, and/or the like.

Client Qualifier 660 includes hardware, firmware, and/or software stored on a computer readable medium. Client Qualifier 660 is optionally disposed on a computing device separate from one or more other elements of Video Server System 620. For example, in some embodiments, Client Qualifier 660 is configured to determine the characteristics of communication channels between Clients 610 and more than one instance of Video Server System 620. In these embodiments the information discovered by Client Qualifier can be used to determine which instance of Video Server System 620 is best suited for delivery of streaming video to one of Clients 610.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
   receiving at a first device associated with a first user a broadcast of a network identifier from a second device configured to render a plurality of images of a game play of a second user playing a video game for presentation on a display, wherein the network identifier identifies the second device;
   selecting at the first device the network identifier for pairing the first device and the second device for communication over a wireless network;
   automatically instantiating at the first device a browser after the pairing of the first device and the second device;
   receiving at the first device a user interface that is streamed from the second device over the wireless network upon the pairing of the first device and the second device, wherein the user interface includes information related to the game play of the second user; and
   automatically displaying the user interface in the browser of the first device,
   wherein the user interface is streamed concurrent with the presentation on the display of the game play of the second user.

2. The method of claim 1,
   wherein the information displayed in the user interface in the browser includes content that is in addition to the game play of the second user that is presented on the display.

3. The method of claim 1, further comprising:
   automatically pairing the first device with the second device over the wireless network after selection of the network identifier at the first device.

4. The method of claim 1, further comprising:
   receiving at the first device a passcode, wherein the passcode is generated by the second device for presentation on the display; and
   pairing the first device with the second device over the wireless network after selection of the network identifier at the first device and authentication of the passcode.

5. The method of claim 1,
   wherein the information displayed in the user interface is generated based on location based information made with reference to a location of a character in a gaming world of the video game generated in association with the game play of the second user,
   wherein the information includes contextually relevant information for the location of the character.

6. The method of claim 1,
   wherein the wireless network includes a Wi-Fi network or Bluetooth network.

7. The method of claim 1,
   wherein the network identifier includes a service set identifier (SSID).

8. A non-transitory computer-readable medium storing a computer program for performing a method, the computer-readable medium comprising:
   program instructions for receiving at a first device associated with a first user a broadcast of a network identifier from a second device configured to render a plurality of images of a game play of a second user playing a video game for presentation on a display, wherein the network identifier identifies the second device;
   program instructions for selecting at the first device the network identifier for pairing the first device and the second device for communication over a wireless network;
   program instructions for automatically instantiating at the first device a browser after the pairing of the first device and the second device;
   program instructions for receiving at the first device a user interface that is streamed from the second device over the wireless network upon the pairing of the first device and the second device, wherein the user interface includes information related to the game play of the second user; and
   program instructions for automatically displaying the user interface in the browser of the first device,
   wherein the user interface is streamed concurrent with the presentation on the display of the game play of the second user.

9. The non-transitory computer-readable medium of claim 8,
   wherein in the method the information displayed in the user interface in the browser includes content that is in addition to the game play of the second user that is presented on the display.

10. The non-transitory computer-readable medium of claim 8, further comprising:
    program instructions for automatically pairing the first device with the second device over the wireless network after selection of the network identifier at the first device.

11. The non-transitory computer-readable medium of claim 8, further comprising:
    program instructions for receiving at the first device a passcode, wherein the passcode is generated by the second device for presentation on the display; and
    program instructions for pairing the first device with the second device over the wireless network after selection of the network identifier at the first device and authentication of the passcode.

12. The non-transitory computer-readable medium of claim 8,
wherein in the method the information displayed in the user interface is generated based on location based information made with reference to a location of a character in a gaming world of the video game generated in association with the game play of the second user,
wherein in the method the information includes contextually relevant information for the location of the character.

13. The non-transitory computer-readable medium of claim 8, wherein in the method the wireless network includes a Wi-Fi network or Bluetooth network.

14. The non-transitory computer-readable medium of claim 8, wherein in the method the network identifier includes a service set identifier (SSID).

15. A computer system comprising:
a processor; and
memory coupled to the processor and having stored therein instructions that, if executed by the computer system, cause the computer system to execute a method, the method comprising:
receiving at a first device associated with a first user a broadcast of a network identifier from a second device configured to render a plurality of images of a game play of a second user playing a video game for presentation on a display, wherein the network identifier identifies the second device;
selecting at the first device the network identifier for pairing the first device and the second device for communication over a wireless network;
automatically instantiating at the first device a browser after the pairing of the first device and the second device;
receiving at the first device a user interface that is streamed from the second device over the wireless network upon the pairing of the first device and the second device, wherein the user interface includes information related to the game play of the second user; and
automatically displaying the user interface in the browser of the first device,
wherein the user interface is streamed concurrent with the presentation on the display of the game play of the second user.

16. The computer system of claim 15,
wherein in the method the information displayed in the user interface in the browser includes content that is in addition to the game play of the second user that is presented on the display.

17. The computer system of claim 15, the method further comprising:
automatically pairing the first device with the second device over the wireless network after selection of the network identifier at the first device.

18. The computer system of claim 15, the method further comprising:
receiving at the first device a passcode, wherein the passcode is generated by the second device for presentation on the display; and
pairing the first device with the second device over the wireless network after selection of the network identifier at the first device and authentication of the passcode.

19. The computer system of claim 15,
wherein in the method the information displayed in the user interface is generated based on location based information made with reference to a location of a character in a gaming world of the video game generated in association with the game play of the second user,
wherein in the method the information includes contextually relevant information for the location of the character.

20. The computer system of claim 15,
wherein in the method the network identifier includes a service set identifier (SSID).

* * * * *